(12) United States Patent
Matsumoto

(10) Patent No.: US 8,284,635 B2
(45) Date of Patent: Oct. 9, 2012

(54) HEAD GIMBAL ASSEMBLY AND INFORMATION RECORDING APPARATUS

(75) Inventor: Takuya Matsumoto, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 673 days.

(21) Appl. No.: 12/348,049

(22) Filed: Jan. 2, 2009

(65) Prior Publication Data

US 2009/0185459 A1 Jul. 23, 2009

(30) Foreign Application Priority Data

Jan. 18, 2008 (JP) ................................. 2008-009202

(51) Int. Cl.
*G11B 11/00* (2006.01)

(52) U.S. Cl. ............ 369/13.33; 369/112.27; 360/125.31

(58) Field of Classification Search ................ 369/13.02, 369/44.14, 13.33, 13.32, 13.24, 112.27; 360/245, 360/59, 294.4
See application file for complete search history.

(56) References Cited

U.S. PATENT DOCUMENTS

| | | | | |
|---|---|---|---|---|
| 5,028,115 | A * | 7/1991 | Grosse-Boes | .................... 385/77 |
| 5,261,015 | A | 11/1993 | Glasheen | |
| 5,546,180 | A | 8/1996 | Garel-Jones et al. | |
| 6,275,453 | B1 * | 8/2001 | Ueyanagi et al. | .......... 369/44.14 |
| 6,385,327 | B1 * | 5/2002 | D'Hoogh | ...................... 381/398 |
| 6,577,793 | B2 | 6/2003 | Vaganov | |
| 6,785,201 | B2 | 8/2004 | Shinohara et al. | |
| 7,974,043 | B2 * | 7/2011 | Shimazawa et al. | ...... 360/125.31 |
| 2006/0044698 | A1 | 3/2006 | Hirano | |
| 2006/0187564 | A1 | 8/2006 | Sato et al. | |
| 2006/0221482 | A1 | 10/2006 | Matsumoto et al. | |
| 2008/0117727 | A1 * | 5/2008 | Matsumoto | ................ 369/44.14 |

FOREIGN PATENT DOCUMENTS

| | | |
|---|---|---|
| JP | 2006-185548 | 7/2006 |
| JP | 2006-294076 | 10/2006 |

OTHER PUBLICATIONS

"An Efficient Probe with a Planar Metallic Pattern for High-Density Near-Field Optical Memory" T. Matsumoto, et al.
"Signal Readout Using Small Near-Field Optical Head with Horizontal Light Introduction Through Optical Fiber" Jpn. J. Appl. Phys. vol. 42 (2003) pp. 5102-5106.
"New Recording Method Combining Thermo-Magnetic Writing and Flux Detection" by H. Saga, et al., pp. 1839-1840.
Office Action in Japanese Application No. 2006-314175, mailed Jan. 4, 2011.

* cited by examiner

*Primary Examiner* — Ali Neyzari
(74) *Attorney, Agent, or Firm* — Brundidge & Stanger, P.C.

(57) ABSTRACT

When a semiconductor laser is arranged outside a slider and a light is to be guided to the slider through a waveguide, the following problems will be solved: the stability of the flying slider is deteriorated due to a stress from the waveguide; and when an actuator is arranged near the flying slider, the motions of the slider are hindered by the waveguide. A waveguide for guiding a light to a light irradiating unit inside a slider, which floats over a medium and has the light irradiating unit for irradiating a light to the medium; and a waveguide for propagating a light from the light source to the waveguide inside the slider, are included. The two waveguides are not in contact with each other, and a relative portion between the two waveguides is movable.

11 Claims, 22 Drawing Sheets

HEAD GIMBAL ASSEMBLY AND INFORMATION RECORDING APPARATUS

CLAIM OF PRIORITY

The present application claims priority from Japanese patent application JP 2008-009202 filed on Jan. 18, 2008, the content of which is hereby incorporated by reference into this application.

FIELD OF THE INVENTION

The present invention relates to a head gimbal assembly having a flying slider that irradiates a light to a recording medium, and to an information recording apparatus provided with the same.

BACKGROUND OF THE INVENTION

In recent years, a thermally assisted magnetic recording has been proposed as a means of realizing high recording density of 1 $Tb/in^2$ or more (H. Saga, H. Nemoto, H. Sukeda, and M. Takahashi, Jpn. J. Appl. Phys. 38, Part 1, and pp. 1839 (1999)). In conventional magnetic recording apparatuses, when a recording density is 1 $Tb/in^2$ or more, there is a problem that recorded information is lost due to a heat fluctuation. In order to prevent this, it is necessary to increase a coercivity of a magnetic recording medium; however, there is a limit to the magnitude of the magnetic field that a recording head can generate, hence, it becomes impossible to form a recording bit on a medium when the coercivity is increased too much. To solve the problem, in the thermally assisted recording, a medium is optically heated at the moment of recording to reduce the coercivity. Due to this, it become possible to record on a medium with a high coercivity and thereby to realize recording densities of 1 $Tb/in^2$ or higher.

In the thermally assisted magnetic recording apparatus, a spot diameter of a light to be irradiated needs to be the same extent as that of a recording bit (several tens of nanometers), because a larger spot diameter eliminates the information in adjacent tracks. To heat such a microscopic region, an optical near-field is used. The optical near-field is a localized electromagnetic field (light of which wave number includes an imaginary component) that exists near a microscopic object of a size smaller than the wavelength of light; and the optical near-field is generated by using a microscopic aperture of a size smaller than the wavelength of light or a metal scatterer. For example, the Technical Digest of 6th international conference on near field optics and related techniques, the Netherlands, Aug. 27-31, 2000 p. 55, proposes an optical near-field generator that employs a triangular metal scatterer as a high-efficiency optical near-field generator. When the metal scatterer is irradiated with a light, plasmon resonance is excited in the metal scatterer, generating a strong optical near-field at the apex of the triangle. Use of such an optical near-field generator enables highly-efficient collection of light in a region of less than several tens of nanometers.

To achieve the above thermally assisted magnetic recording, it is necessary to optically heat a recording medium near a magnetic pole for applying a magnetic field. To realize this, for example, a waveguide is formed beside the magnetic pole such that a light from a semiconductor laser that is a light source, is guided to a position near the tip of the magnetic pole. In the case, the semiconductor laser is located, for example, at the root of a suspension, and a light is guided from there to a flying slider using the waveguide made of optical fiber, etc. (Kenji Kato et al., Jpn. J. Appl. Phys. Vol. 42, pp. 5102-5106 (2003)).

SUMMARY OF THE INVENTION

When a light is guided from a semiconductor laser to a flying slider through a waveguide, a stress of the waveguide is transmitted to the flying slider, resulting in the unstable flying of the slider. In addition, when a recording density becomes higher, which entails a narrower track pitch, the tracking servo is needed to have a higher tracking accuracy in the case. In order to improve the tracking accuracy, a method is also proposed in which an actuator is mounted near the flying slider to actively control a position of the flying slider (US 2006/0044698 A1). However, when the light waveguide is coupled to the flying slider, the slider is hindered in its movement, thereby resulting in the fact that the slider is difficult to be controlled by the actuator.

An object of the present invention is to solve the following problems that: when the semiconductor laser is arranged outside the slider and a light is guided to the flying slider using the waveguide, the stability of the flying slider is deteriorated due to a stress of the waveguide; and the slider is hindered in its movements by the waveguide.

A head gimbal assembly according to the present invention includes a flying slider, a suspension, and a mount, wherein the mount includes a movable portion to which the flying slider is fixed, a piezo element that is fixed to the suspension and is used for adjusting a position of the flying slider, and a fixed portion to which the waveguide for optical transmission is mounted. A mirror is formed at the end portion of the waveguide on the fixed portion, such that a light emitted from the waveguide is directly coupled in the waveguide formed inside the flying slider. The waveguides on the movable portion side and the fixed portion side are not in contact with each other, but structured such that the waveguide on the movable portion side is movable relative to that on the fixed portion side. Accordingly, a stress is never transmitted from the waveguide on the fixed portion side to the movable portion. Due to this, the flying stability of the flying slider, which is fixed to the movable portion, is not impaired by a stress from the waveguide. It is also possible that the movable portion can be moved actively by the piezo element or the like.

When mode field diameters of the waveguides on the fixed portion side and inside the slider, are too small, an intensity of a light coupled in the waveguide inside the slider, fluctuates as the movable portion moves. Herein, the mode field diameter means a width of the range where a light intensity is obtained by multiplying the peak light intensity by $1/e^2$ in a light intensity distribution of a mode that is capable of propagating through the waveguide. To prevent the problem stated above, it is possible that a smaller amount between mode field diameters of the waveguides both on the fixed portion side and inside the slider, is set to 3.5 μm or more. With this, a light intensity fluctuation can be suppressed to 10% or less. When two mode field diameters of the waveguides both on the fixed portion side and inside the slider are different from each other, the smaller one of the two may be 3.5 μm or more. Alternatively, it is also possible that the beam has an elliptic shape. In the case, with the movable direction of the movable portion and the long axis direction of the beam being set to be parallel with each other, a light intensity fluctuation can be suppressed to a smaller one, when the movable portion moves. In the case, it is also possible that a mode field diameter measured in the direction parallel to the movable direction is 3.5 μm or more, while a mode field diameter in the direction perpendicular to the movable direction is 3.5 μm or less.

At the time of fixing the waveguide that propagates a light from the light source, or the slider to the fixed portion or the movable portion, when an amount of dislocation from the target position is large, a power fluctuation then becomes large and a coupling efficiency is deteriorated. To prevent the problem, a dislocation amount may be corrected by applying an offset bias to the piezo element for the tracking servo.

In order to suppress the influence by a fluctuation of the coupling efficiency between the two waveguides, the fluctuation being generated by movement of the movable portion, a light intensity of the light source may also be adjusted. Change in increased temperature of a medium generated by a power fluctuation, may also be suppressed by changing a pulse width or a modulation frequency of a laser, instead of changing an intensity of the light source. It is also possible that the stable recording is realized by adjusting a time lag between the timing of applying a laser pulse and that of applying a magnetic field. All of the light intensity, the pulse width, the modulation frequency, and the timing may also be controlled at a same time.

When adjusting an intensity or a pulse width of the light source in order to suppress the influence by the coupling efficiency fluctuation, the condition that a mode field diameter is 3.5 μm or more is not always necessary to be satisfied.

An intensity of the light source may be determined based on the recording and reproduction signal. For example, the recording and reproduction signal is acquired while changing a voltage applied to the piezo element, thereby a laser intensity (a current amount to be inputted into the laser)at which a ratio of signal to noise of the recording and reproducing signal is highest, is determined for each voltage. It is also possible that, with the relation between the piezo-applied voltages and the optimal laser-input current amounts being stored, a current to be inputted in the laser is adjusted so as to be an optical amount, with reference to the relation, at the time of actual recording and reproduction.

An intensity of the light source may also be adjusted by detecting an intensity of a light that is coupled in the waveguide inside the slider, then by forming a feedback loop based on the detected intensity. That is, when the detected light intensity is large, an intensity of the light source (or an input current amount) is made small, and in the opposite case, an intensity of the light source is made large, thereby the intensity fluctuation can be suppressed.

The waveguide for propagating a light from the light source may be fixed to the movable portion, while the slider is fixed to the fixed portion side. When a stress is transmitted to the waveguide, the movable portion moves so as to release the stress. As a result, the stable flying of the slider is no longer hindered by the stress of the waveguide. In the case, a light amount of the light source may also be controlled by monitoring an amount of a light coupled in the waveguide inside the slider, then by forming a feedback loop. Or, an intensity of the light source may also be controlled based on a displacement amount of the movable portion, the displacement amount being measured after a displacement sensor for monitoring positions of the movable portion is provided.

The movable portion for the tracking servo may also be provided inside the slider. Due to the structure, the movable portion can be lighter, thereby the movable portion can moves at a higher response speed.

An optical device, such as a lens, may also be inserted between the waveguide for propagating a light from the light source, and the waveguide inside the slider. For example, lenses are arranged at the emitting portion of the waveguide for propagating a light from the light source (on the fixed portion side), and at the incident portion of the waveguide inside the slider (on the movable portion side), respectively, such that a light propagates between the two lenses as a parallel light. When a light propagates as a parallel light in such a manner, the distance between the focal point of the lens and the end portion of the waveguide is not changed, even when the movable portion moves; thereby, a fluctuation of the coupling efficiency between the two waveguides can be suppressed when the movable portion moves. It is noted that, in this case, assuming that the focal distance of the lens and a mode field diameter on the side of the waveguide for propagating a light from the source light, are $f_1$ and $d_1$, respectively; and the focal distance of the lens and a mode field diameter, on the side of the waveguide inside the slider, $f_2$ and $d_2$, respectively, the coupling efficiency between the two waveguides can be a maximum when $f_1/f_2=d_1/d_2$ is satisfied. In the case, by satisfying $f_1>f_2$, positions of the waveguide can be easily controlled at the coupling potion between the light source and the waveguide for optical transmission (the larger a mode field diameter, the larger a tolerance for the dislocation).

When a semiconductor laser is used as the light source, the semiconductor laser may be arranged on the fixed portion of the mount rather than propagating a light from the semiconductor laser via the waveguide.

According to the present invention, in a thermally assisted magnetic recording apparatus in which a semiconductor laser, which is a light source, is arranged outside a flying slider, and the semiconductor laser and the flying slider are connected by a waveguide, a stress that is transmitted from the waveguide to the flying slider can be reduced, thereby allowing the stable flying of the slider to be achieved. Also, an actuator can be arranged near the flying slider, thereby allowing the tracking with a higher accuracy to be achieved.

BRIEF DESCRIPTION OF THE DRAWINGS

FIG. 2A a cross-sectional side view taken along line "D-D'", seen from the direction of the arrow B in FIG. 1; and FIG. 2B a cross-sectional side view taken along line "C-C'", seen from the direction of the arrow A in FIG. 1;

FIG. 5A is a view illustrating the positional relation between the waveguides, and FIG. 5B is a graph illustrating the coupling efficiency dependency;

FIG. 17A illustrates the case where the waveguide for propagating a light from the light source to the slider, and the waveguide inside the slider, are coupled directly with each other, and FIG. 17B the case where another waveguide is located between the waveguide for propagating a light from the light source to the slider, and the waveguide inside the slider;

FIG. 24A is a side view illustrating the case where a mirror is formed between the semiconductor laser and the waveguide inside the slider; FIG. 24B is a side view illustrating the case where a GRIN lens with a mirror is formed; and FIG. 24C is a side view illustrating the case where a laser with a mirror is used;

FIG. 27A illustrates the case where a heating position is located on the trailing side; and FIG. 27B the case where a heating position is located on the leading side.

DETAILED DESCRIPTION OF THE PREFERRED EMBODIMENT

Hereinafter, embodiments according to the present invention will be described with reference to the accompanying drawings.

Figure 1:
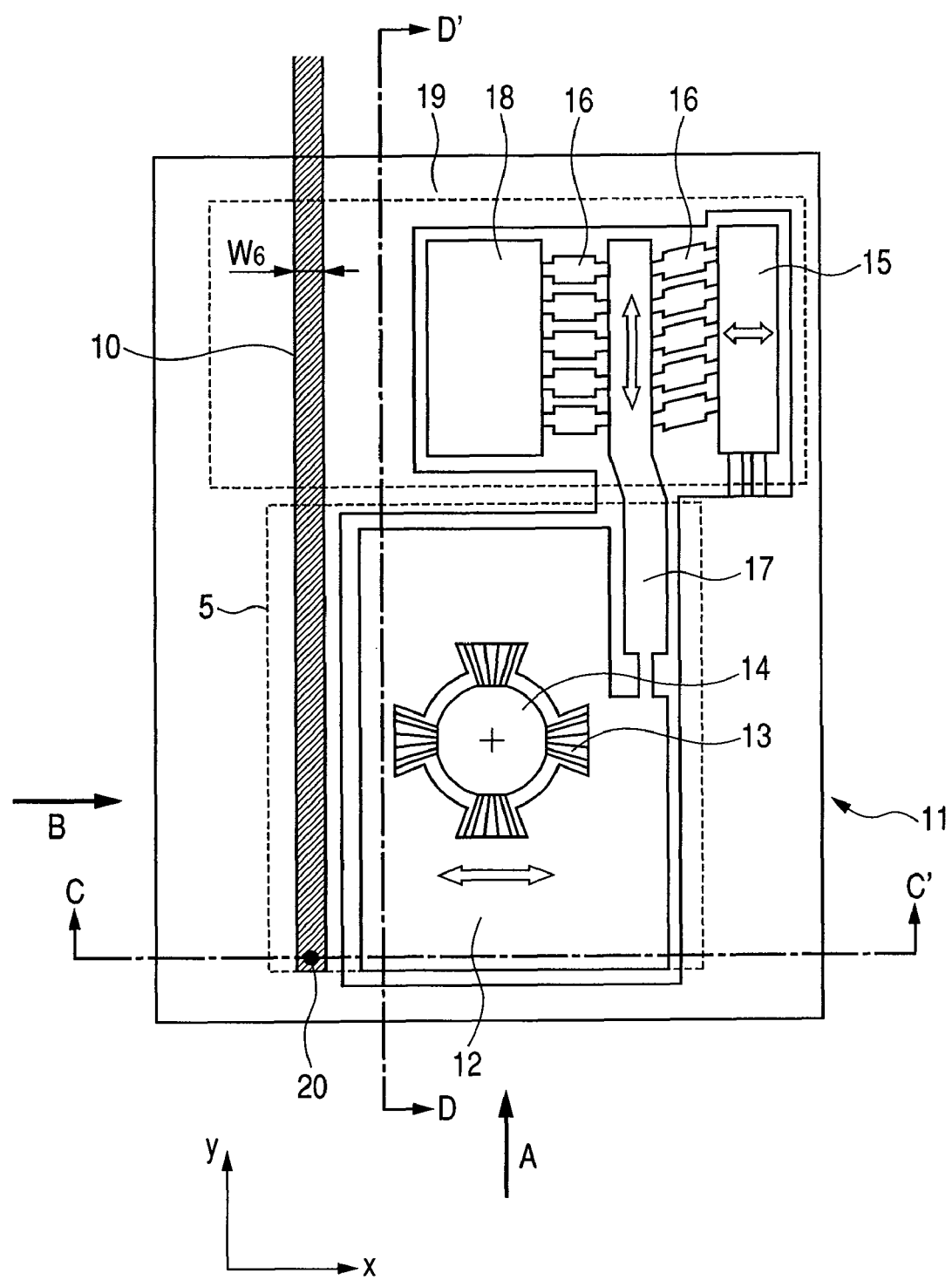
FIG. 1 is a view illustrating a head and a head gimbal assembly according to the present invention, seen from the recording media side.
Figure 2A:
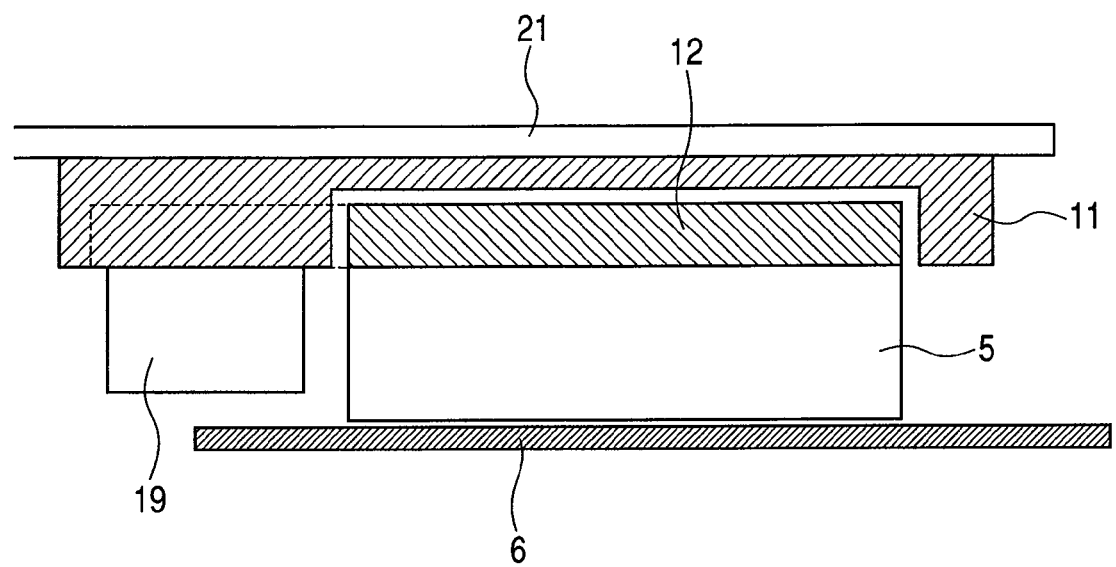
FIG. 2A and FIG. 2B are cross-sectional views illustrating a head and a head gimbal assembly according to the present invention, seen from the direction perpendicular to a suspension axis.
Figure 2B:
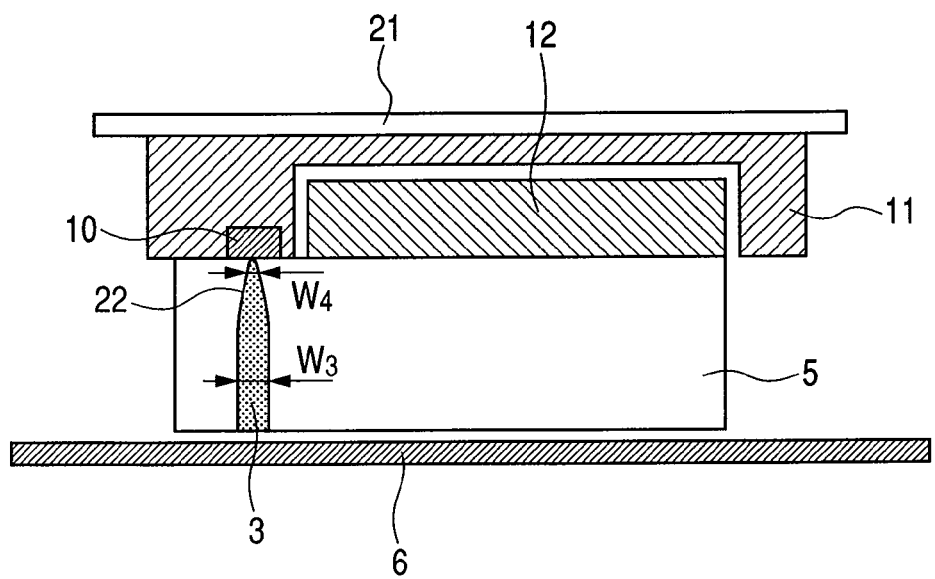
Figure 3:
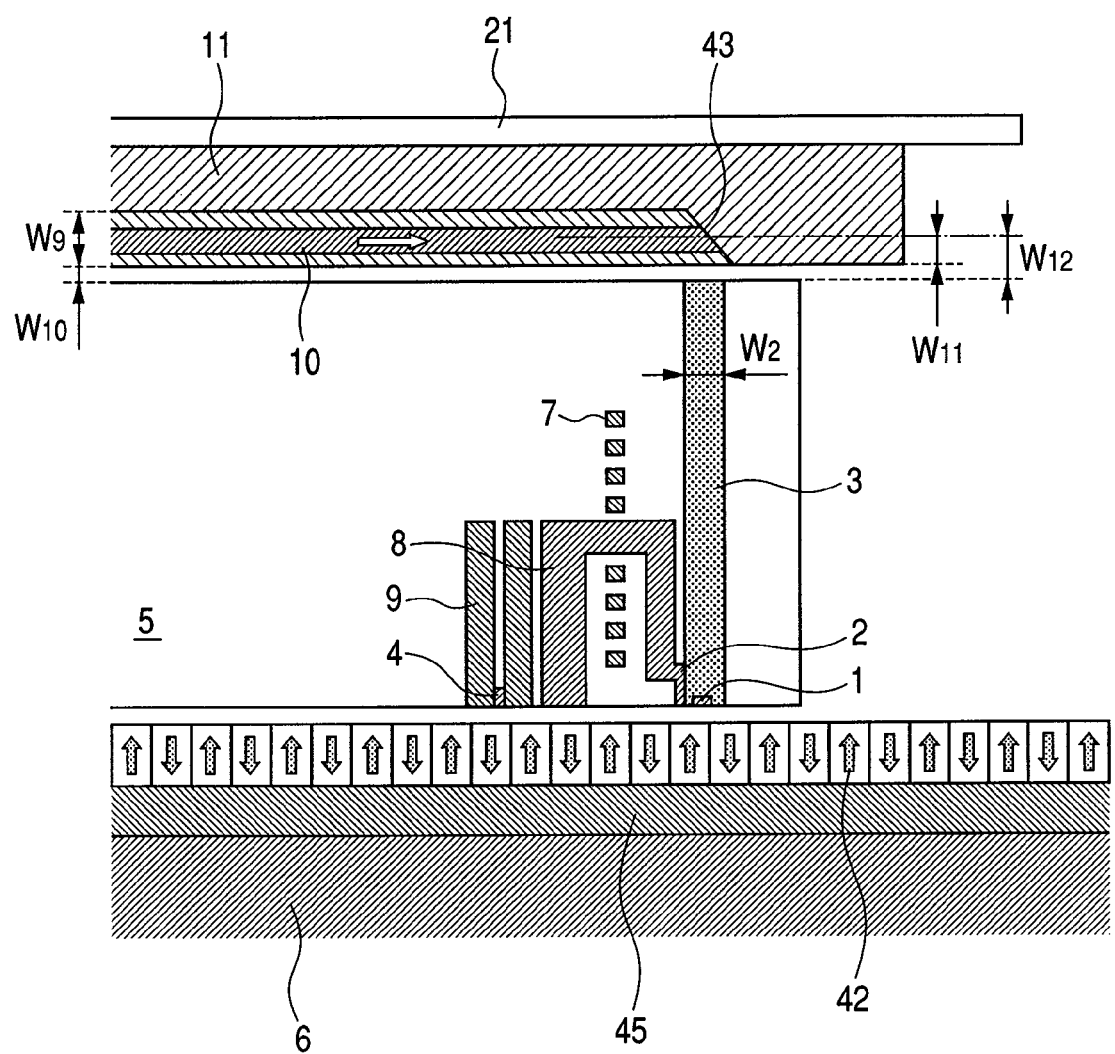
FIG. 3 is a cross-sectional view illustrating a head and a head gimbal assembly according to the present invention, seen from the direction parallel to the suspension axis.

FIGS. 1 to 3 illustrate a structure example of the case where the waveguide and the slider are formed on the mount having a mechanism for adjusting positions of the slider for the tracking servo. FIG. 1 illustrates a view of the bottom face of the mount(seen from the media side); FIG. 2A a cross-sectional side view taken along line "D-D'", seen from the direction of the arrow B in FIG. 1; FIG. 2B a cross-sectional side view taken along line "C-C'", seen from the direction of the arrow A in FIG. 1; and FIG. 3 a cross-sectional side view of the head and a medium seen from the direction of the arrow B. The present structure is composed of the flying slider 5, the suspension 21, and the mount. The mount is composed of the fixed portion 11, the movable portion 12 to which the flying slider 5 is fixed (slider holding portion), the piezo element 19 for adjusting positions of the flying slider, and the waveguide 10 for propagating a light from the light source.

The piezo element 19 for adjusting positions of the slider, was fixed to the fixed portion 11 such that the element could extend and contract in x direction of the drawing. One end of the piezo element (left side of the drawing) was fixed to the fixed portion 11 while the other end to the movable portion 15, which was movable relative to the fixed portion 11. The movable portion 15 is connected to the flexure 16, and the movable portion 17 to the flexure 16. The flexure 16 is also connected to the other side of the movable portion 17, and the other end of the flexure 16 is fixed to the fixed portion 18 that is fixed relative to the fixed portion 11. When applying a voltage to the piezo element 19, the piezo element 19 extends and contracts in x direction, entailing the movement of the movable portion 15 in x direction. At the time, the flexure 16 moves in y direction, thereby the movable portion 17 moving in y direction. The movable portion 17 is connected to the slider holding portion 12. The rotation axis 14 was formed at the center of the slider holding portion 12. The rotation axis 14 and the slider holding portion 12 were connected together by the flexure 13 such that the slider holding portion 12 could rotate around the rotation axis 14. The flying slider 5 was fixed to the slider holding portion 12. The slider holding portion 12 is connected to the movable portion 17, thereby, when the movable portion 17 moves in y direction, the slider holding portion 12 rotates corresponding thereto. That is, positions in y direction of the flying slider 5 (positions in y direction of the waveguide 3 formed inside the slider), the slider 5 being connected to the slider holding portion 12, can be adjusted by adjusting a voltage applied to the piezo element 19.

The waveguide 10 for propagating a light from the light source was fixed on the fixed portion 11. In the present example, a polymer waveguide of which clad has a width in x direction $W_8$ of 50 μm and a thickness of 30 μm, was adopted as the waveguide 10. The light emitted from the semiconductor laser propagates through the waveguide 10 to reach the end portion thereof. The mirror 43 was formed at the end portion of the waveguide 10 as illustrated in FIG. 3, such that a light propagating through the waveguide 10 was emitted toward the direction substantially perpendicular to the surface of the slider.

Figure 4:
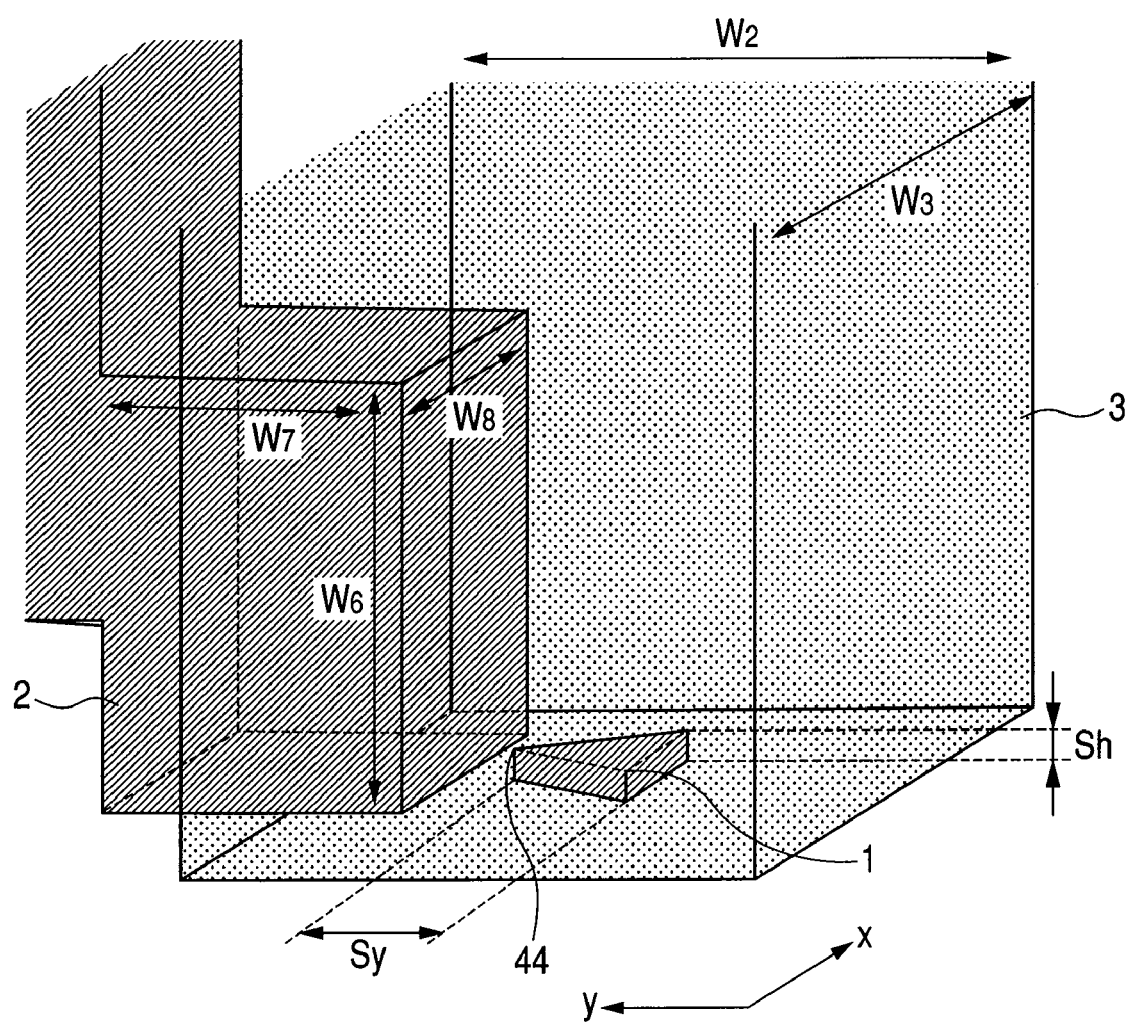
FIG. 4 is a perspective view illustrating an optical near-field generator and a magnetic pole.

As illustrated in FIG. 3, the waveguide 3 for guiding a light to the flying face of the slider, was formed inside the flying slider 5. A optical near-field generator 1 for generating a light spot having a diameter of several tens of nanometers, and a magnetic field generator for applying a magnetic field, were formed near the lower portion of the waveguide (at the emitting end). As the optical near-field generator 1, a conductive scatterer with a triangular shape was adopted in order to generate an optical near-field very efficiently, as illustrated in FIG. 4. The material of the scatterer was set to gold, and a length Sy and a height Sh thereof were set to 100 nm and 50 nm, respectively. When a light that is biased in y direction is incident to the scatterer, the plasmon resonance occurs therein to generate a strong optical near-field at the apex 44 of the scatterer.

The position 20 of the waveguide 10 from which a light is emitted is dislocated from the center of the fixed portion 11, as illustrated in FIG. 1. Accordingly, the waveguide 3, the optical near-field generator 1, and the magnetic field generator, which are items on the side of receiving the emitted light, were arranged at the positions dislocated from the center of the slider, as illustrated in FIG. 2B.

In the above structure, the waveguide 3 inside the slider and the waveguide 10 fixed to the fixed portion 11, are apart from each other rather than being coupled. Accordingly, a stress from the waveguide 10 is not transmitted to the slider, allowing the movements of the slider not to be hindered. As a result, it is ensured that a flying height of the slider is not unstable and the movements of the actuator for increasing the tracking accuracy, is not hindered.

The core material of the waveguide 3 inside the slider was set to $SiO_xN_y$, while the material of the peripheral part (clad portion) to $Al_2O_3$. A ratio of O to N of $SiO_xN_y$ was adjusted such that the refractive index of $SiO_xN_y$ was larger than that of $Al_2O_3$. A width $W_2$ in y direction was set to 200 nm while a width $W_3$ in x direction to 400 nm. The material of the waveguide may be acceptable if the refractive index of the core is larger than that of the clad; for example, the clad material may be set to $SiO_2$ and the clad material to $Ta_2O_5$, $TiO_2$, $SiO_xN_y$, and Ge-doped $SiO_2$. Alternatively, the clad material may be set to $Al_2O_3$, and the core material to $Ta_2O_5$.

It is preferable that the waveguide 3 becomes a single-mode waveguide nearby the optical near-field generator. In the case where the optical near-field generator is located at the central portion of the waveguide, when an intensity of a light propagating through the waveguide is the strongest at the center thereof, an intensity of a light incident to the optical near-field generator can be made strongest, thereby allowing a optical near-field to be generated most efficiently. In the case of a single-mode waveguide, the intensity distribution of a light propagating through the waveguide (an intensity distribution of the lowest-order mode) is a distribution in which an intensity is strongest at its center, as stated above; thereby allowing a optical near-field to be generated most efficiently. Contrary to this, in the case of a multi-mode waveguide, a high-order mode is also excited as well as the lowest-order mode. In a high-order mode, a light intensity becomes strongest at positions other than its center. Accordingly, generation of an optical near-field is deteriorated in its efficiency. In the case of a multi-mode waveguide, a mode field diameter in the waveguide becomes larger as compared to that with a single-mode waveguide. Accordingly, when the waveguide becomes a multi-mode waveguide, a power density is smaller, thereby light-use efficiency (ratio of converting to energies for a optical near-field) is decreased.

It is preferable that a mode field diameter of the waveguide 3 is smaller at positions nearby the optical near-field generator. However, as stated later, in the portion where the waveguide 3 is coupled to the waveguide 10 (upper side of the slider), it is preferable that a mode field diameter of the waveguide 3 is larger in order to reduce a fluctuation of the coupling efficiency with the waveguide 10 and a power fluctuation of a light coupled in the waveguide 3. To realize this, a taper portion was formed in the upper portion of the waveguide 3 such that a mode field diameter on the inlet side of the waveguide 3 is larger than that at a position nearby the optical near-field generator.

Figure 6:
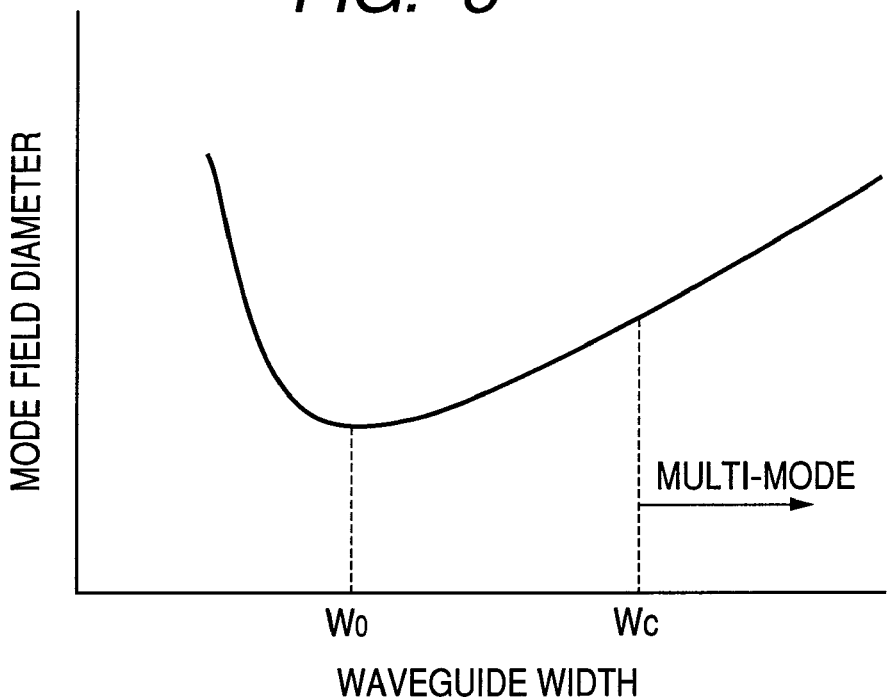
FIG. 6 is a graph illustrating the relation between waveguide widths and mode field diameters.

As illustrated in FIG. 6, the smaller a waveguide core width, the smaller a mode field diameter in the waveguide; however, when the waveguide core width is smaller than a certain amount $W_0$, the equivalent refractive index of the core is close to the refractive index of the clad, thereby, a mode field diameter is on the contrary larger, as a waveguide core width is smaller. In the present example, a waveguide width $W_3$ nearby the optical near-field generator of the waveguide was set to $W_0$ such that a mode field diameter nearby the device was a minimum; and a waveguide width $W_4$ near the inlet of the waveguide was set to $W_0$ or less such that a mode field diameter near the inlet was larger. In fact, the clad material of the waveguide 3 was set to $Al_2O_3$ (refractive index=1.63) and the core material thereof to $SiO_xN_y$, and wherein a ratio of O to N was adjusted such that the refractive index of $SiO_xN_y$ was larger than that of $Al_2O_3$ by 0.07. A width $W_2$ in y direction of the waveguide 3 was set to 200 nm, a width $W_3$ in x direction at the lower portion to 400 nm, and a width $W_4$ near the inlet to 100 nm. In the case, mode field diameters near the inlet of the waveguide are about 4 μm in x direction and about 3 μm in y direction.

It is also possible that, at the inlet of the waveguide 3, a mode field diameter is larger by setting a width $W_4$ to $W_0$ or more; however, when $W_4$ is too large, a high-order mode is excited (in the case where a width is $W_c$ or more in FIG. 6. In the case where the waveguide 3 is a multi-mode waveguide near the inlet of the waveguide 3, and a single-mode waveguide nearby the optical near-field generator, an intensity amount in the waveguide possibly fluctuates by the interference between modes in the waveguide (an intensity amount fluctuates by the environmental change, such as change in temperature). As a result, the recording is possibly to be unstable. Accordingly, it is preferable that a waveguide width near the inlet is smaller than $W_c$ beyond which the mode is multi-mode. However, as stated later, when a mechanism by which a power fluctuation in the waveguide 3 can be suppressed is provided (in the case of FIG. 14 or the like), a multi-mode waveguide near the inlet is acceptable.

Figure 7:
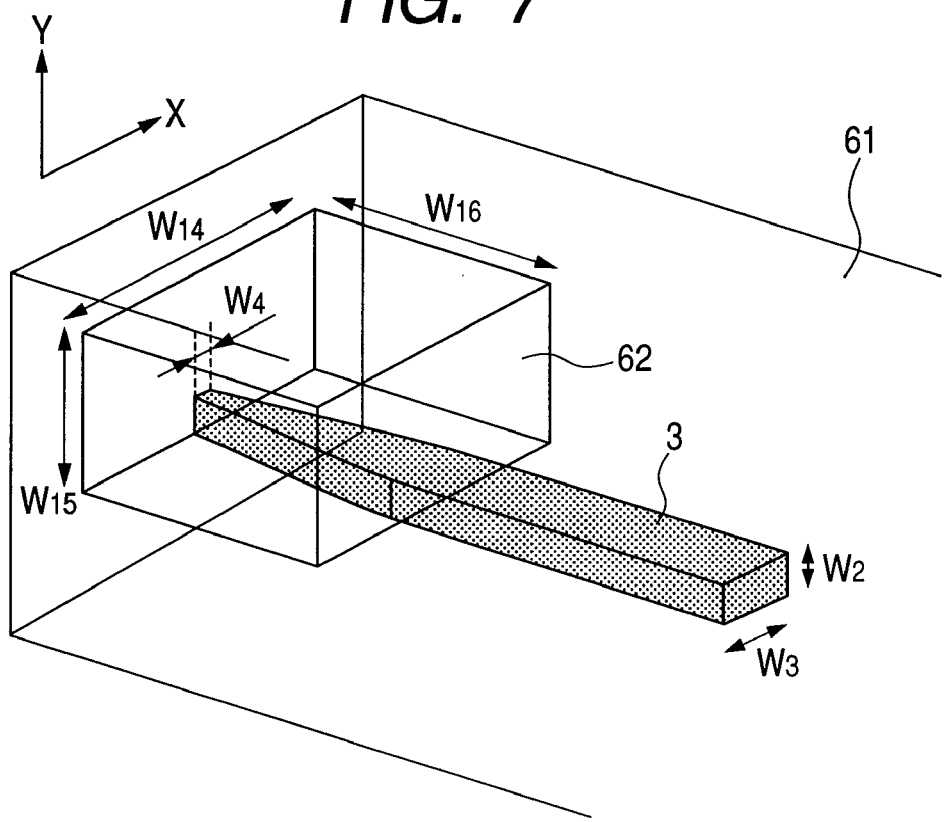
FIG. 7 is a view illustrating the case where a refraction index of the inlet portion of the waveguide is made small.

In order to further extend a mode field diameter at the inlet of the waveguide 3, a spot diameter converter as illustrated in FIG. 2A and FIG. 2B in IEEE Journal of Selected Topics in Quantum Electronics, Vol. 11, No. 1, 2005, p 232, may be formed at the inlet of the waveguide 3. In the present example, the core material of the waveguide 3 was set to $Ta_2O_5$ (refractive index=2.18) and the clad material at the lower portion of the waveguide (outlet side) was set to $Al_2O_3$ (refractive index=1.63). As illustrated in FIG. 7, a core width was set to be small near the inlet of the waveguide, and a layer 62, which was made of a material having the intermediate refractive index between the two refractive indexes of the core and the clad of the waveguide 3, was formed around the core made of $Ta_2O_5$. The material of the layer 62 was set to $SiO_xN_y$, and a ratio of O to N was adjusted such that the refractive index of $SiO_xN_y$ was larger than that of $Al_2O_3$ by 0.05. A width $W_2$ near the outlet of the waveguide 3 was set to 300 nm, $W_3$ to 300 nm, and a width near the inlet $W_4$ to 100 nm. A width $W_{14}$ of the layer 62 was set to 4 μm, a width $W_{15}$ to 3 μm, and a length $W_{16}$ to 150 μm.

As illustrated in FIG. 3, the magnetic field generator for generating a magnetic field was formed nearby the optical near-field generator 1. The magnetic field, which was generated by using the coil 7, was guided nearby the optical near-field generator 1 by the main pole 2. When the magnetic pole is located near the core of the waveguide 3, an intensity of a light propagating through the waveguide was attenuated by the presence of the magnetic pole (the evanescent light penetrating through the clad portion clashes with the magnetic pole to be absorbed or scattered). Therefore, the distance between the main pole 2 and the waveguide 3 was set to be as large as possible, while set to be small nearby the optical near-field generator. The distance between the apex 44 where an optical near-field was generated, and the main pole 2, was set to 10 to 30 nm. When the optical near-field generator 1 is arranged at the center of the waveguide 3, the main pole 2 enters the core of the waveguide 3 nearby the optical near-field generator 1. In the case, in order to reduce lights absorbed or scattered (reflected) by the, magnetic pole, it is preferable that a length of the magnetic pole $W_6$ entering the core of the waveguide 3 is set to be as small as possible. However, when the length $W_6$ is too small, a magnetic field intensity is decreased; therefore it is not good that the length $W_6$ is too small. In the present example, $W_6$ was set to 200 nm. The widths $W_7$ and $W_8$ at the tip of the magnetic pole were set to 200 nm in y direction, and to 100 nm in x direction, respectively. In order to form a closed magnetic circuit, a soft magnetic layer 45 was formed under a recording layer 42 of a medium, and a return pole 8 was formed on the other side of the main pole. A magnetic read sensor 4 for reproduction was formed beside the head for writing. In the present example, a Giant Magneto Resistive (GMR) device or a Tunneling Magneto Resistive (TMR) device was adopted as a magnetic read sensor. A shield 9, which prevents a leak of the magnetic field, was formed in the peripheral portion of the magnetic read sensor 4. In the above example, the magnetic pole 2 was formed so as to enter the waveguide 3; however, the magnetic pole may also be arranged outside the core, not to decrease a light intensity. For example, the magnetic pole may be arranged so as to be in contact with the side face of the core. In the case, the optical near-field generator 1 is not necessary to be located at the center of the waveguide, and may be arranged at a position drawn to the main pole side.

Figure 5A:
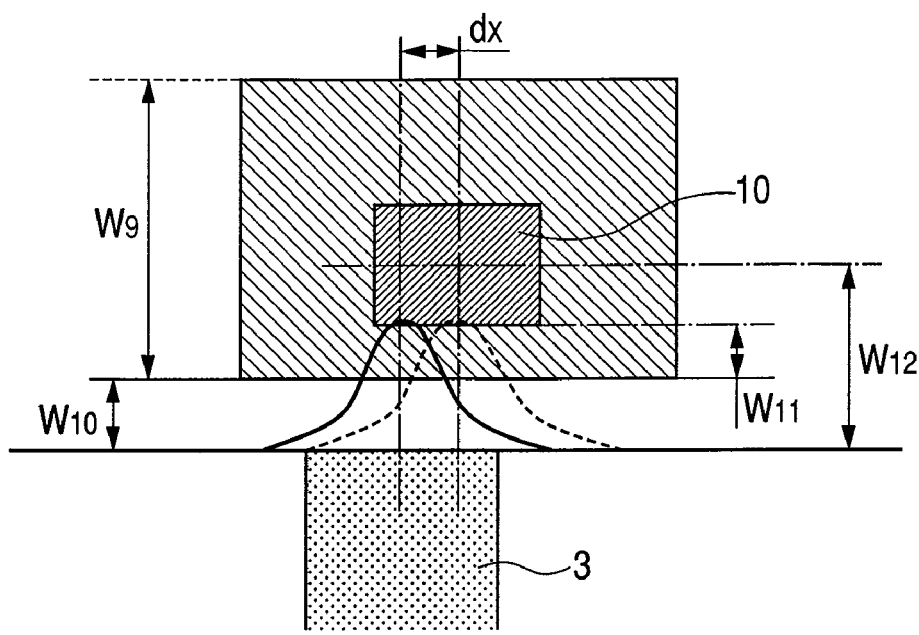
FIG. 5A and FIG. 5B are views illustrating the relation between dislocation amounts between a waveguide for propagating a light from a light source and a waveguide inside a slider, and coupling efficiencies.
Figure 5B:
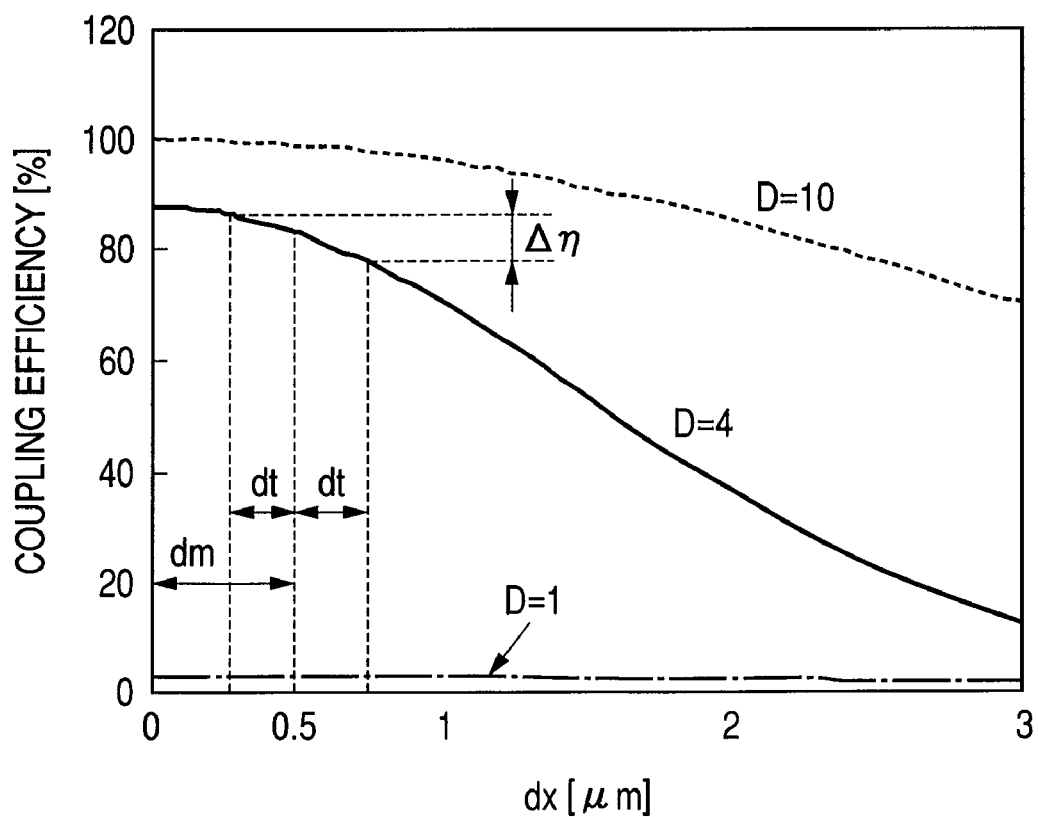

The movable portion 12 is movable relative to the fixed portion 11. Accordingly, the position of the waveguide 3 inside the slider changes relative to the waveguide 10 fixed to the fixed portion 11. In the case, a ratio that a light emitted from the waveguide 10 is coupled in the waveguide 3 changes. In FIG. 5B, the relation between dislocation amounts dx, which occur when the core center of the waveguide 10 fixed to the fixed portion 11 is dislocated from that of the waveguide 3 inside the slider, and coupling efficiencies is illustrated. In the present example, on the premise that a mode field diameter of a light propagating through the waveguide 10, and that of a light propagating through the waveguide 3, are equal, the amount of them was set to 1.4 or 10 μm. Assuming that the light wavelength was 780 nm, a distance $W_{12}$ between the core center of the waveguide 10 and the center of the incidence end of the waveguide 3, was set to 12 μm. That is, a distance $W_{11}$ between the core center of the waveguide 10 and the bottom face of the waveguide 10 was set to 9 μm, and a distance $W_{10}$ between the bottom face of the waveguide and the surface of the slider to 3 μm. A mode field diameter of the waveguide 10 represents an amount at the emitting end thereof (just before being reflected by the mirror 43), and that of the waveguide 3 represents an amount at the incident end thereof. The dislocation amount dx means the distance between the center of a light reflected by the mirror 43 (point where an intensity is strongest) and the center of a light propagating through the waveguide 3, as illustrated in FIG. 5A, in which the coupling portion of the two waveguides is seen from A direction.

As illustrated in FIG. 5B, as a dislocation amount dx is larger, a coupling efficiency is decreased. In fact, when mounting the waveguide or the slider on the fixed portion 11 or the movable portion 12, a dislocation also occurs. In the present example, a range dt in which the movable portion 12 moves for tracking was set to ±0.2 μm. A dislocation amount dm occurring at the time of mounting was 0.5 μm at a maximum. Accordingly, because dx=dt+dm is satisfied, when a dislocation amount dm, which occurs at the time of mounting, is largest, a dislocation amount dx then changes from 0.3 μm to 0.7 μm. For example, when a mode field diameter D of the waveguide is 4 μm, a change amount (Δη) of the coupling efficiency is about 8%.

Figure 8:
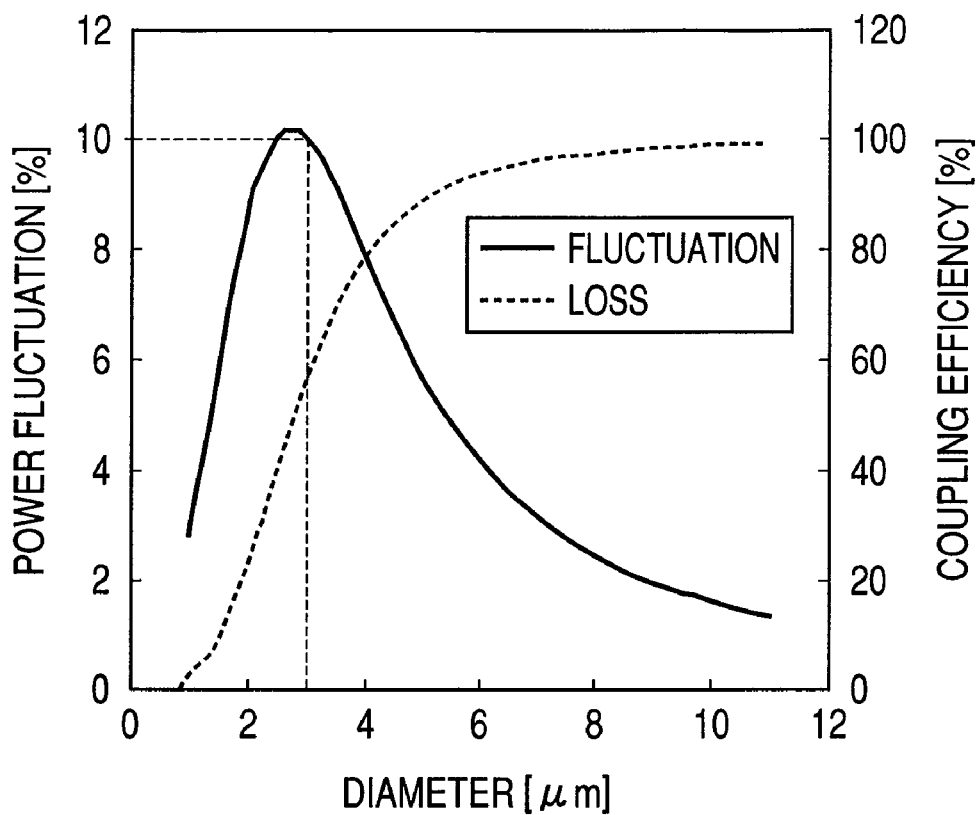
FIG. 8 is a graph illustrating the relation between mode field diameters of the waveguide and light intensity fluctuation.

The above change amount (Δη) of the coupling efficiency depends on mode field diameters of both the waveguide 3 and the waveguide 10. The relation between mode field diameters and change amounts of the coupling efficiency (equivalent to the power fluctuation of a light coupled in the waveguide 3), and the relation between mode field diameters and coupling efficiencies of the two waveguides, are illustrated in FIG. 8. Herein, assuming that mode field diameters of the two waveguides were equal with each other, a distance between the two waveguides was set to 12 μm. In addition, an amount dt in which the movable portion 12 moved for tracking was set to ±0.2 μm, and a dislocation amount dm occurring at the time of mounting the waveguide or the slider to 0.5 μm.

As illustrated in FIG. 8, when a mode field diameter is 2.5 μm, a power fluctuation is largest; and when the diameter is larger or smaller than that, a power fluctuation is smaller. The reason why, as a mode field diameter is larger, a power fluctuation is smaller, is that: when a mode field diameter is large, as illustrated by the curve of the case where a mode field diameter is 10 μm in FIG. 5B, a coupling efficiency is not decreased greatly even if a dislocation amount is large. That is, when a mode field diameter is large, lights emitted from the waveguide are distributed in a wide range; therefore, even if the position of the waveguide 3, which receives the lights, is dislocated from the center, an intensity of a light coupled in the waveguide 3 is difficult to be decreased. In addition, the reason why, as a mode field diameter is smaller, a power fluctuation is smaller, is that: when a mode field diameter is small, as illustrated by the curve of the case where a mode field diameter is 1 μm in FIG. 5B, a dislocation amount is small, because the original coupling efficiency (a coupling efficiency when dx=0) is small. When a power fluctuation is large, a heating temperature of a medium changes, and a bit pitch and a bit width of the recording bit change, resulting in the unstable recording. In order to achieve the stable recording, a power fluctuation is necessary to be suppressed to 10% or less. To realize this, it is preferable that a mode field diameter in the movable direction is 3.5 μm or more. Alternatively, a power fluctuation can be suppressed to 10% or less by means that a mode field diameter is set to 1.5 μm or less. In the case, however, a coupling efficiency becomes 10% or less, resulting in the lack of power. Accordingly, a mode field diameter is preferably 3.5 μm or more.

In the above example, it is assumed that mode field diameters of the two waveguides are equal with each other, but may also be different. In the case, when a smaller mode field diameter of those of the waveguide 3 and the waveguide 10 is 3.5 μm or more, a change amount Δη of coupling efficiencies can be suppressed to 10% or less. For example, a mode field diameter of the waveguide 3 may also be 4 μm and that of the waveguide 10 be 7 μm. In addition, a beam shape of a light propagating through the waveguide may be elliptic rather than circular. In the case, it is preferable that the direction of the long axis of the ellipse is the same as the movable direction of the movable portion 12. That is, a dislocation amount dx of the waveguide becomes larger in the movable direction. Therefore, a power fluctuation can be reduced by enlarging a mode field diameter in the movable direction. For example, when the movable portion 12 moves in x direction, as with the example of FIG. 1, it is preferable that a mode field diameter in x direction is larger than that in y direction. When the movable portion moves only in one direction, it is also possible that a mode field diameter in that direction is 3.5 μm or more, and a mode field diameter in the direction perpendicular to the movable direction is 3.5 μm or less. In the present example, mode field diameters at the inlet of the waveguide 3 were set to 5 μm in x direction and to 3 μm in y direction, respectively; and mode field diameters of the waveguide 10 were set to 8 μm in x direction and to 6 μm in y direction.

As illustrated in FIG. 5A and FIG. 5B, when an amount dm of dislocation from the target position, the dislocation occurring at the time of mounting the waveguide 10 and the slider 5, is large, a power fluctuation is large and a coupling efficiency is also decreased. In order to reduce the dislocation amount, it is also possible that a dislocation amount dx is reduced by adding an offset bias to a voltage that is to be applied to the piezo element 19 for the tracking servo. That is, on the premise that a moving amount that the slider moves by applying the offset bias (position adjustment amount) is da, and a moving amount that the movable portion for the tracking servo moves is dt, a total dislocation amount dx is represented by dx=dt+dm+da. When dm+da is made small by adding an offset, then a power fluctuation and a decrease of a coupling efficiency can be suppressed. In the present example, after mounting the waveguide 10 and the slider, an offset bias was applied to the piezo element 19 such that dm+da was to be 0. Because a movable range of the movable portion 12 is limited, when a dislocation amount (dm) occurring at the time of mounting, dm+da cannot always be 0 even when an offset bias is applied. In the case, an offset bias may be adjusted within the movable range of the movable portion 12. For example, on the premise that a movable amount of the movable portion 12 (a range movable by the piezo element 19) is ±0.5 μm and a moving amount dt that the movable portion 12 moves for the tracking servo is ±0.25 μm, if a dislocation amount dm occurring at the time of mounting is ±0.25 μm or less, dm+da can be adjusted so as to be 0 by applying an offset to the piezo element 19. When a dislocation amount dm is larger than that, it is possible that the dislocation amount dm is first corrected to the extent of 0.25 μm by applying an offset to the piezo element 19, subsequently, a power fluctuation is made to be small (coupling efficiency is made so as to be increased).

Figure 9:
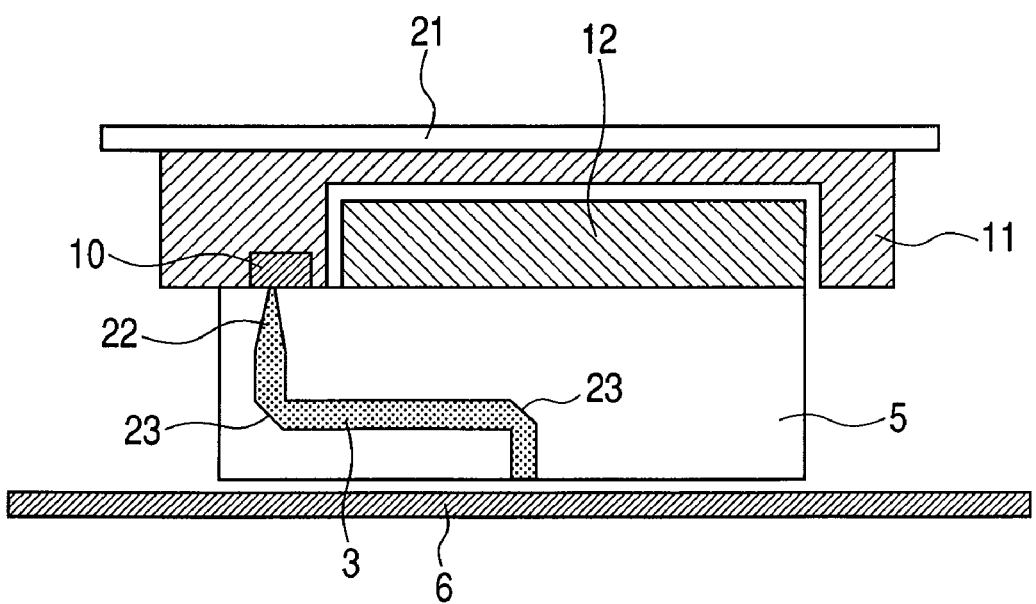
FIG. 9 is a view illustrating an example in which the optical path of the waveguide inside the slider is bent.

In the above example, the waveguide 10 was arranged aside rather than at the center of the fixed portion 11, because the movable portion 12 is located at the center of the fixed portion 11. As a result, the optical near-field generator 1 and the magnet head were arranged at portions dislocated from the center. When arranged at portions dislocated from the center, the optical near-field generator 1 and the magnetic head move not only in x direction but also y direction. That is, when adjusting positions in the direction perpendicular to the recording track, they also move in the direction parallel to the track. To prevent this, it is possible that the optical near-field generator 1 and the magnetic head are arranged at the center of the slider by forming a mirror 23 on the waveguide 3 and by bending the waveguide 3, as illustrated in FIG. 9.

Figure 10:
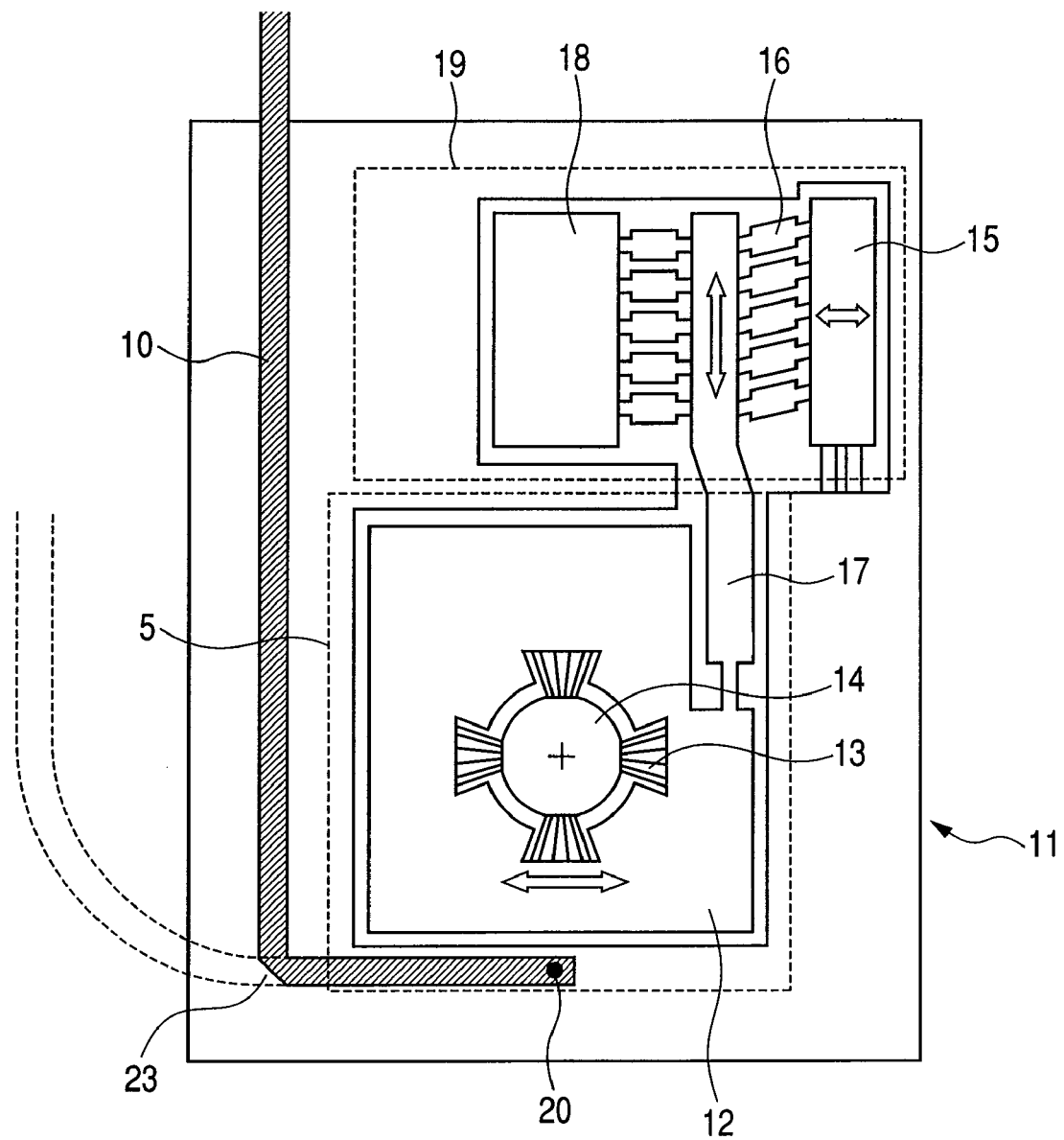
FIG. 10 is a view illustrating an example in which the optical path of the waveguide for propagating a light from the light source to the slider, is bent.

In the above example, the optical near-field generator 1 and the magnetic head were arranged at the center of the slider by bending the waveguide 3; however, it is also possible that the waveguide 10 is bent by forming a mirror 23 on the waveguide 10 fixed to the fixed portion 11 rather than bending the waveguide 3, as illustrated in FIG. 10. With this, the coupling portion 20 between the waveguide 10 and the waveguide 3 inside the slider can be located at the center of the slider, and the optical near-field generator 1 and the magnetic head can also be located at the center thereof. In examples of FIG. 1 and FIG. 9, when the movable portion 12 moves in x direction, the dislocation between the waveguide 10 and the waveguide 3 inside the slider occurs in not only x direction but also y direction. Contrary to this, when the coupling portion 20 is located at the center of the slider as illustrated in FIG. 10, a dislocation in y direction is small. A coupling loss between the two waveguides becomes small by just that much. In the present example, the waveguide 10 was bent by using the mirror 23; however, it is also possible that the coupled portion 20 between the waveguide 10 and the waveguide 3 is located at the center by bending the waveguide in a curved form as illustrated by the dot line in FIG. 10.

Figure 11:
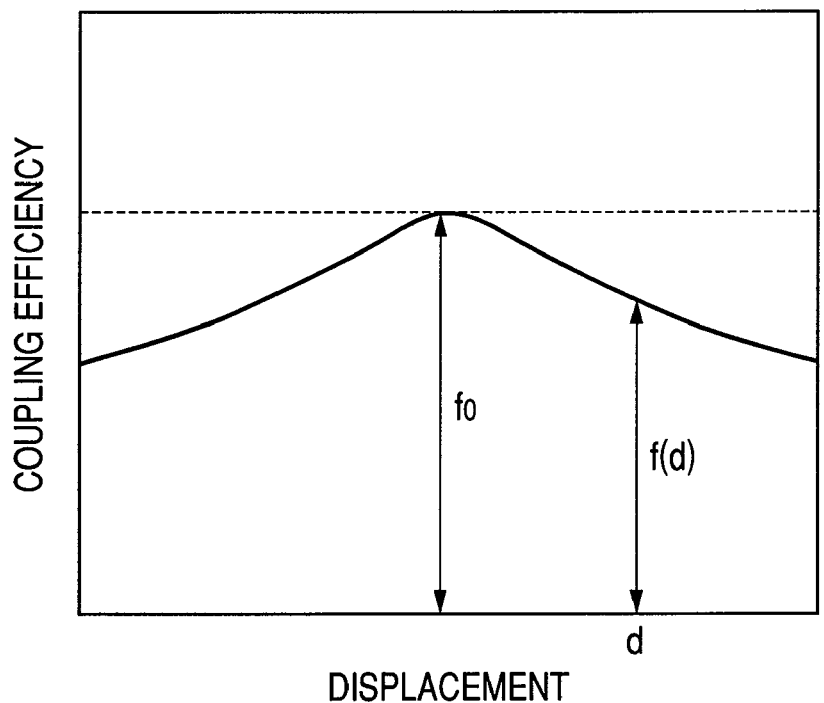
FIG. 11 is a graph illustrating the relation between displacement amounts and coupling efficiencies between the two waveguides.

In the above example, because the waveguide 10 moves relative to the waveguide 3, a coupling efficiency between the two waveguides changes, resulting in the change in the intensity of a light propagating through the waveguide 3. In order to reduce the change in the intensity, a light intensity of the light source may be adjusted. That is, when an elongation amount of the piezo element 19 is determined, a dislocation amount dx (when dislocated also in y direction, dy) between the two waveguides is then determined; as a result, an intensity of a light to be coupled in the waveguide 3 is determined, as illustrated in FIG. 11. In the case where a coupling efficiency at a dislocation amount d is f(d), when a power P of the light source is adjusted so as to be represented by Equation 1, $$P = P_0 \cdot \frac{f_0}{f(d)} \qquad \text{[Equation 1]}$$

an intensity of a light propagating through the waveguide inside the slider, can be made constant; wherein, $P_0$ represents a power of the light source when a coupling efficiency is highest, and $f_0$ a coupling efficiency at the time. A coupling efficiency is proportional to a light intensity of in the waveguide 3, and a dislocation amount of the piezo element is proportional to a voltage applied thereto (or an input voltage in the piezo driver). When a semiconductor laser is used as a light source, an intensity of the light source is almost proportional to the input current I. Accordingly, the above equation may also be the converted to Equation 2;

$$I = I_0 \cdot \frac{g_0}{g(V)} \qquad \text{[Equation 2]}$$

wherein g(V) represents an intensity of a light in the waveguide 3 at each voltage, $g_0$ an intensity of a light in the waveguide 3 when an intensity of a light in the waveguide 3 is strongest, and $I_0$ a current amount at the time.

Figure 12:
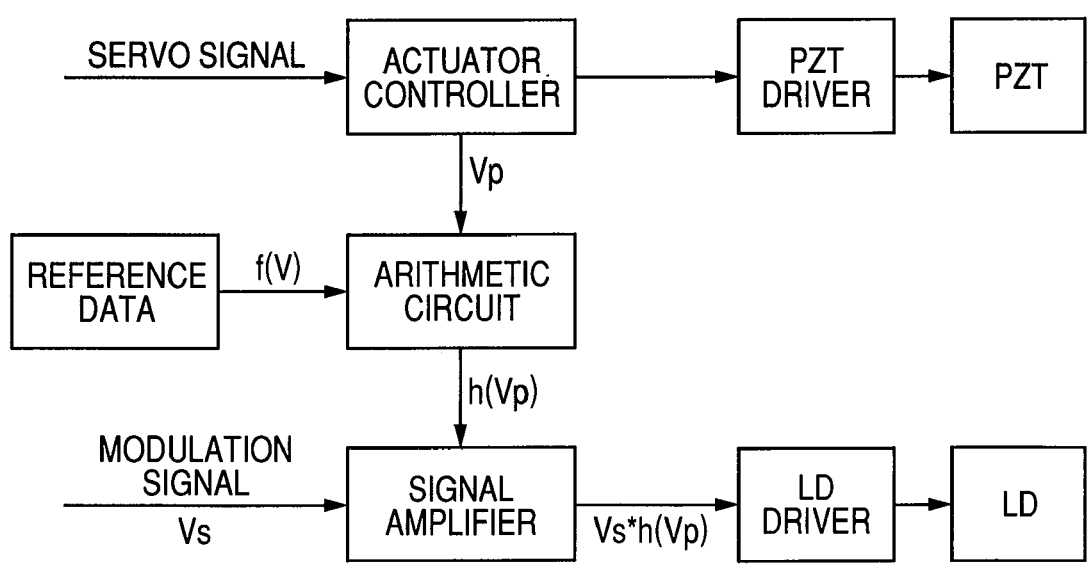
FIG. 12 is a view illustrating a circuit structure in which an intensity of the light source is adjusted based on a dislocation amount of an element, which is used for moving a mount on which the waveguide for propagating a light from the light source to the slide is mounted, or for moving a mount on which the waveguide inside the slider is mounted.

In the present example, after assembling the waveguide 10 and the slider 5 or the like, a ratio h(V) of the maximum light intensity $g_0$ to a light intensity g(V) in the waveguide 3: h(V)=$g_0$/g(V) was determined at each voltage (V), by measuring an intensity of a light emitted from the outlet of the waveguide 3 while changing a voltage $V_p$ applied to the piezo driver. The relation was stored on an IC circuit as the reference data for controlling. A semiconductor laser was used as a light source, and by changing a current input therein, a magnitude of the light source was changed. As illustrated in FIG. 12, an arithmetic circuit that outputted a voltage h(V) when a voltage V was inputted, was prepared, and inputted a voltage $V_p$ therein, $V_p$ being an input voltage for the piezo driver. An amount obtained by multiplying the output voltage h($V_p$) by a modulation signal $V_s$ for recording, was input in the semiconductor laser driver such that a current proportional to the amount passed through the semiconductor laser. In the present example, on the premise that a light intensity in the waveguide 3 is $g_1$, and a maximum light intensity in waveguide 3 $g_0$, when a voltage applied to the piezo element 19 is $V_1$, the peak value of a laser propagating in the waveguide 3 is made to be constant by multiplying a current amount input in the semiconductor laser by $g_0/g_1$. It is also possible that a light intensity in the waveguide 3 is controlled so as to be constant by applying an offset current, which is proportional to ($g_0-g_1$), to a current in the semiconductor laser.

As is in the above example, when a light intensity of a light source is controlled, a light intensity in the waveguide 3 does not change even if a coupling efficiency between the waveguide 10 and the waveguide 3. Accordingly, the condition that a mode field diameter should be 3.5 μm or less is not always necessary to be satisfied.

It is also possible that a rise in temperature of a medium occurring by a power fluctuation is suppressed by changing a pulse width or a modulation frequency of a laser instead of adjusting a light intensity of a laser. That is, when a light intensity in waveguide 3 is decreased, a fall of an increased temperature of a medium can be prevented by enlarging a pulse width or increasing the number of pulses per bit.

Figure 27A:
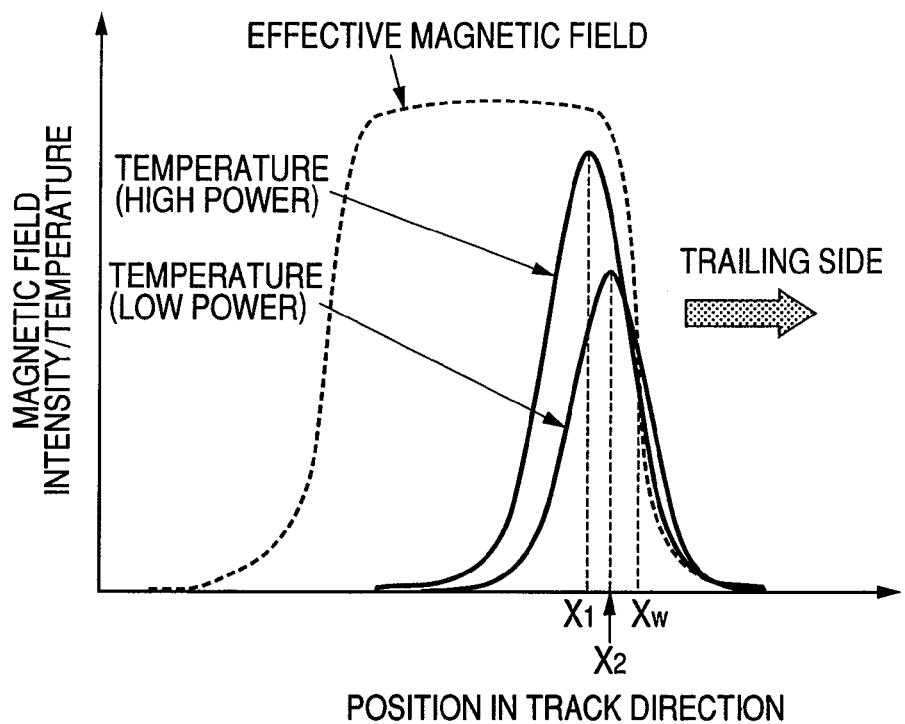
FIG. 27A and FIG. 27B are graphs illustrating the relation between applied magnetic fields and thermal distributions.
Figure 27B:
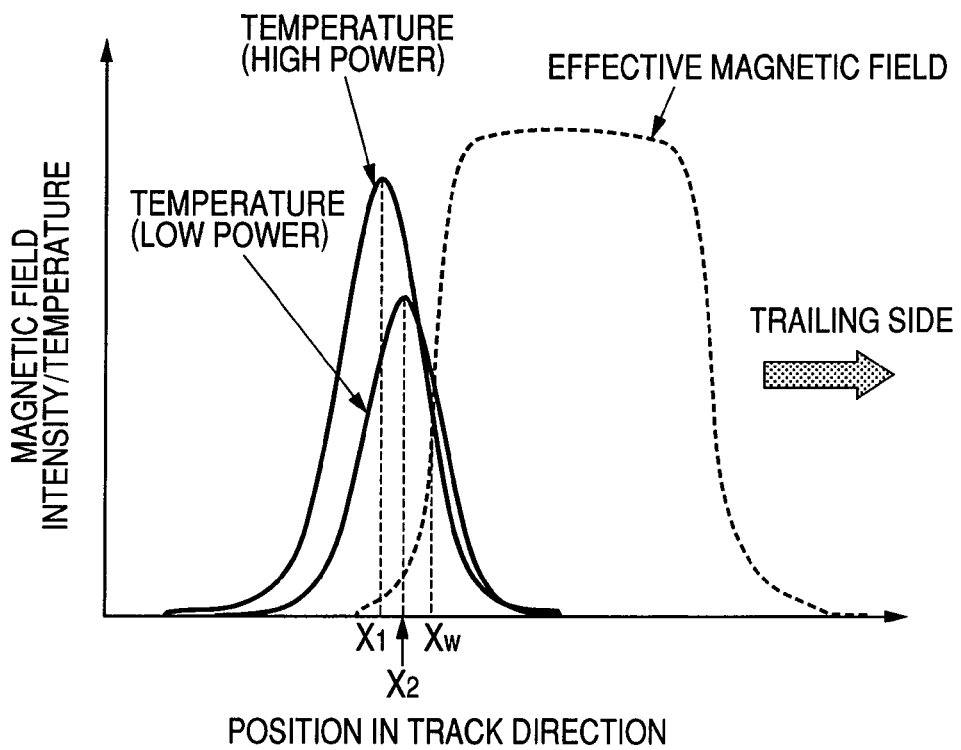

In addition, it is also possible that the stable recording is realized by adjusting a time lag between the timing of applying a laser pulse and that of applying a magnetic field. That is, as illustrated in FIG. 27A and FIG. 27B, in order to record such that an SNR (signal/noise ratio) of a reproduction signal is high, it is preferable that a position ($X_W$) where the following two positions are superimposed on each other, is located at a portion where the recording bit changes (bit border), wherein the two positions are: a position where a gradient of an effective magnetic field intensity is largest; and a position where a heat gradient is largest. When a position of the light spot is located on the trailing side relative to the position of the magnetic head, the position of the light spot is located on the trailing side of the magnetic field distribution (FIG. 27A); and when the position of the light spot is the leading side relative to the position of the magnetic field, the position thereof is on the leading side of the magnetic field distribution (FIG. 27B). In the case, when a light power changes, the position where the heat gradient is largest shifts. In order to always place the position where the heat gradient is largest at the same position, the peak position of the heat gradient needs to be changed. That is, the peak position needs to be changed by delaying the timing of applying a light pulse. For example, when a light intensity is decreased, the peak position ($X_2$) is shifted to the trailing side by delaying the timing of applying a pulse. It is also possible that the light intensity, the pulse width, the modulation frequency, and the timing, which are all stated above, are all controlled at a same time.

In the above example, the relation between voltages to be applied to the piezo element 19 and light intensities in the waveguide 3, was determined by monitoring a light emitted from the outlet of the waveguide 3, immediately after assembling the waveguide 10 and the slider or the like; however, it may also be determined based on a recording and reproduction signal, after providing them in the drive. For example, after acquiring a recording and reproduction signal while changing a voltage applied to the piezo element 19, a laser intensity where an SNR of a recording and reproduction signal is highest (current amount to be inputted in the laser), is determined at each voltage. It is also possible that the relation between voltages inputted in the piezo element and optimal current amounts inputted in the laser, is stored, and in an actual recording and reproducing, a current in the laser is adjusted so as to be optimal by referring to the relation. It is possible that the acquisition of the optimal current amount is performed immediately after building up the drive; however, the amount may possibly change with time, therefore, it is preferable that the amount is acquired regularly at the times such as follows: immediately after the drive is powered on; during an idling state; and when starting recording, etc. In addition, it is also possible that, to acquire the data, a recording and reproduction test-dedicated region is provided in a specific region of a recording disk (tip of the recording sector, inner or outer circumferences of the disk, etc.).

Figure 13:
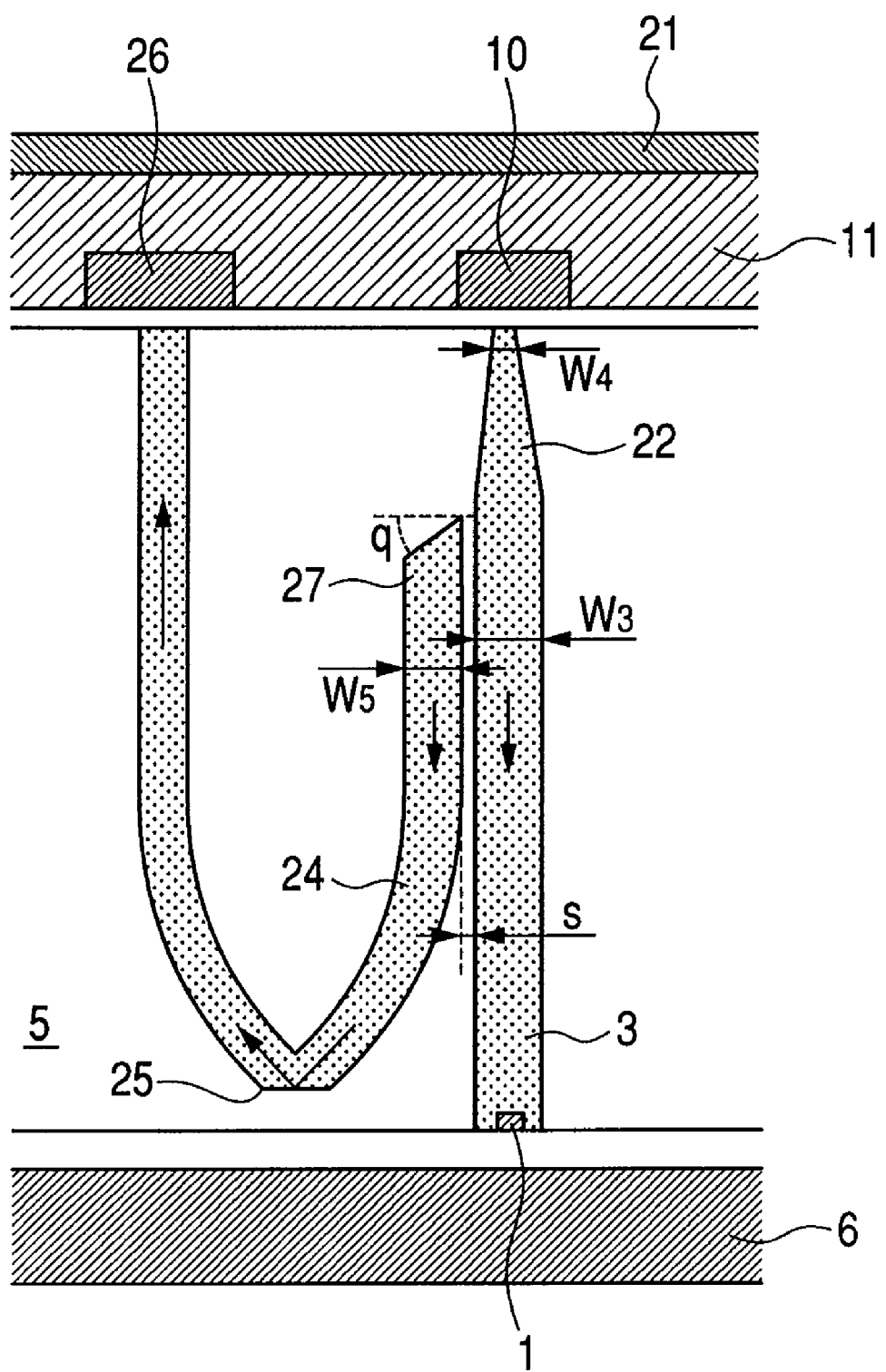
FIG. 13 is a view illustrating a mechanism for detecting an intensity of a light in the waveguide and illustrating the case where a single-mode waveguide is adopted.

In the above example, an intensity of the light source was determined based on the optimal data determined in advance; however, it is also possible that, after detecting an intensity of a light coupled in the waveguide 3, an intensity of the light source is adjusted by forming a feedback loop based on the detected intensity. An example thereof is illustrated in FIG. 13. FIG. 13 is a schematic cross-sectional view, seen from A direction in FIG. 1. In the example of FIG. 13, part of lights coupled in the waveguide 3 inside the slider was coupled in a second waveguide 24 arranged near the waveguide 3, and a light was detected by a photodiode 26. The second waveguide 24 is arranged such that a distance S from the waveguide 3 is the wavelength or less. With this, a light in the waveguide 3 was coupled in the second waveguide 24 via the evanescent light. The core materials of the waveguide 3 and the second waveguide 24 were set to $Ta_2O_5$, and the clad materials thereof to $Al_2O_3$. The core widths $W_3$ of the waveguide 3 and the second waveguide 24 were set to 400 nm, and widths $W_2$ thereof to 200 nm. A mirror 25 was formed along the way of the second waveguide 24 such that a propagating light was propagated in the direction opposite to the recording medium 6. When a light propagating through the second waveguide 24 is reflected at the end of the second waveguide to interfere with a light propagating in the waveguide, the intensities of lights in the second waveguide 24 and the waveguide 3 fluctuate. In order to prevent the reflection at the end portion of the waveguide, as illustrated in FIG. 13, the face of the end portion 27 on the inlet side of the second waveguide 24, was made to tilt relative to the traveling direction of a light in the waveguide. A light emitted from the tilted second waveguide 24 was detected by the photodiode formed on the fixed portion 11.

Figure 15:
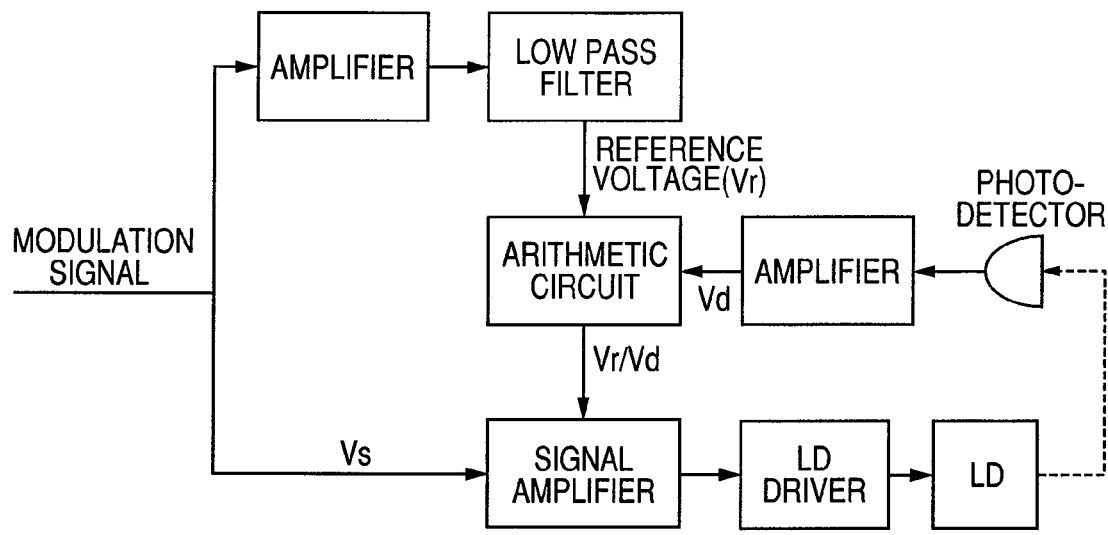
FIG. 15 is a view illustrating a mechanism for adjusting an intensity of the light source, based on an output of a detector that detects an intensity of a light in the waveguide.

As illustrated in FIG. 15, an output signal of the photodiode was amplified by a current to voltage converter amplifier to be input in an arithmetic circuit. The arithmetic circuit outputs a ratio of the voltage $V_d$ to the reference voltage $V_r$. It was made that an amount obtained by multiplying the ratio by a modulation signal was input in the driver of the semiconductor laser, and a current proportional to the amount passes through the semiconductor laser. The reference voltage $V_r$ is dependent on the modulation signal. In the present example, an amount $V_r$ was obtained by multiplying the modulation signal $V_s$ by a constant G, then by passing it through a filter having the same band as that of the photodiode. The constant G was set to an amount that satisfies $GV_s/V_d=1$, when a coupling efficiency between the two waveguides becomes highest. In the above example, an intensity of the source light (current amount in the semiconductor laser) was adjusted based on the ratio of the voltage $V_d$, which was proportional to the detected light, to the reference voltage $V_r$; however, it is also possible that an intensity of the light source is controlled based on the difference between the voltage $V_d$ and the reference voltage $V_r$. That is, it is also possible that a current in the semiconductor laser is controlled by adding an amount, which is obtained by multiplying $(V_d-V_r)$ by the gain $G_1$, to $V_S$.

Figure 14:
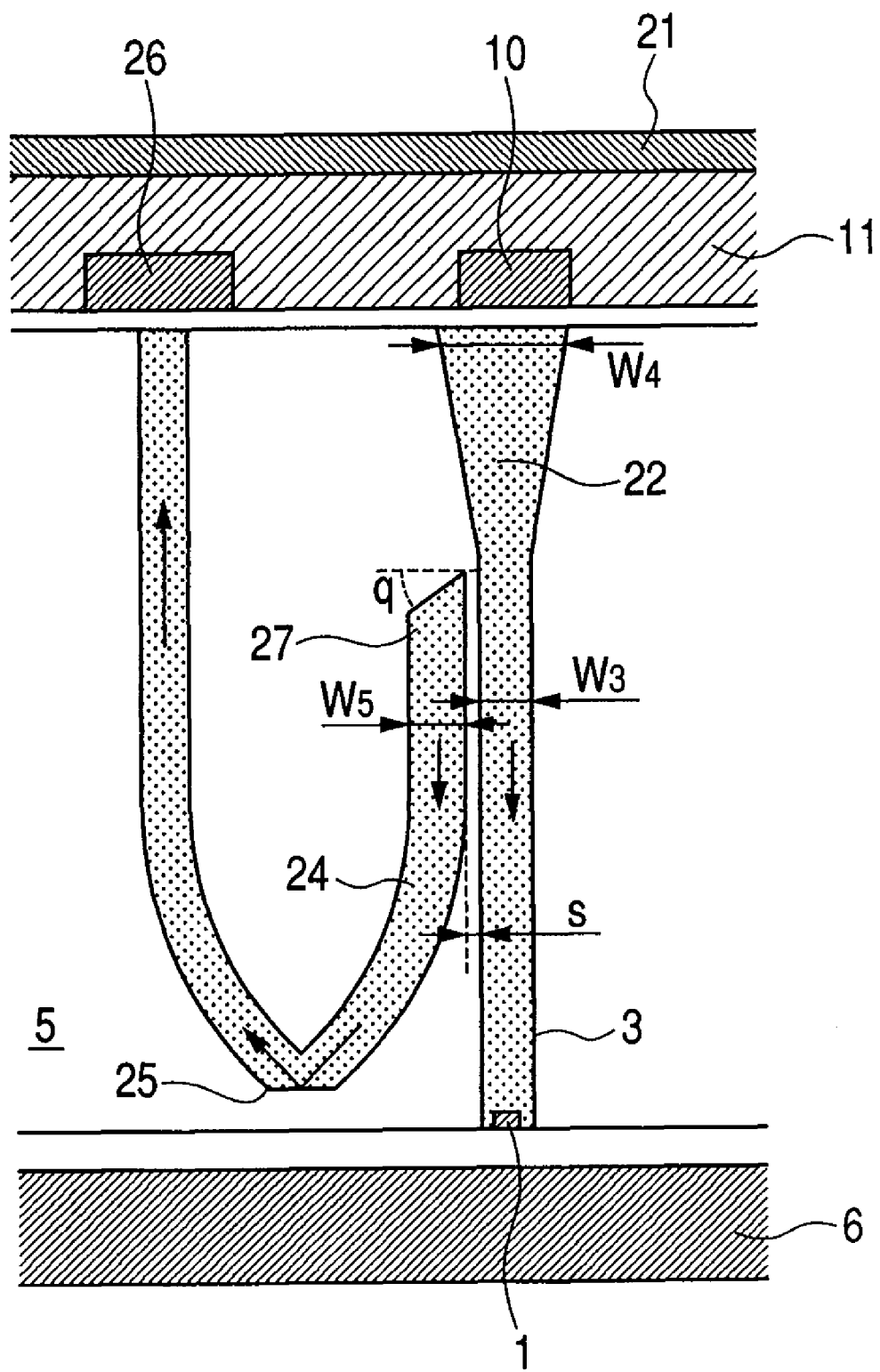
FIG. 14 is a view illustrating a mechanism for detecting an intensity of a light in the waveguide and illustrating the case where a multi-mode waveguide is adopted.

As stated above, in the case where, after detecting an intensity of a light coupled in the waveguide 3, a feedback loop is formed based on the intensity, it is also possible that, as illustrated in FIG. 14, the waveguide 3 is made to be a multi-mode waveguide by enlarging the inlet width thereof, and is made to be a single-mode waveguide near the outlet thereof by gradually narrowing its width. By being a multi-mode waveguide, a mode field diameter near the inlet of the waveguide can be enlarged; thereby, a coupling efficiency between the two waveguides can be higher. When the distance between the core center of the waveguide 10 and the inlet end of the waveguide 3, is large, the larger the beam diameter, the higher the coupling efficiency.

In the case, an intensity near the outlet of the waveguide 3 possibly fluctuates by the interference between the modes. That is, a high-order mode is converted to a low-order mode at the portions where the width thereof gradually changes; at the time, a power in the waveguide 3 possibly fluctuates by the interference between the modes. Contrary to that, as illustrated in the example of FIG. 14, a power fluctuation can be suppressed to a smaller one, by means that, after detecting an intensity of a light propagating through a portion that has been made single-mode, a feedback loop is formed such that the light intensity is constant. In the example of FIG. 14, the core material of the waveguide 3 was set to $Ta_2O_5$, and clad material to $Al_2O_3$. The width $W_2$ near the outlet of the waveguide 3 was set to 200 nm, $W_3$ to 400 nm, and the width $W_4$ near the inlet thereof to 5 μm. The width in y direction of the waveguide 3 may also be constant; however, the width in y direction may also be changed along the way to enlarge a mode field diameter in y direction near the inlet. In the present example, the width in y direction near the inlet was set to 5 μm, and the width was made gradually smaller.

Figure 16:
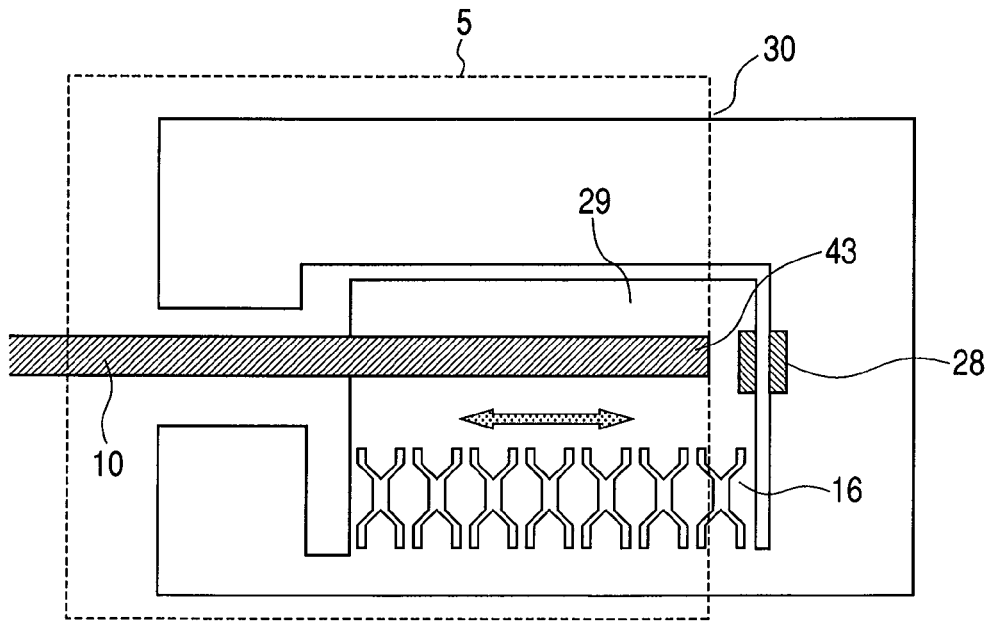
FIG. 16 is a view illustrating an example of the case where the waveguide for propagating a light from the light source to the slider, moves.

In the above example, the movable portion 12 was made to be actively activated by the piezo element 19 for the tracking servo, and the slider was stuck thereto. However, as illustrated in FIG. 16, it is also possible that the waveguide 10 is mounted on the movable portion 29 while the slider is mounted on the fixed portion side (FIG. 16 is a view seen from the medium side). In the case, the movable portion 29 is made to move freely without the piezo element 29 provided. With this, when a stress is applied to the waveguide 10, the movable portion 12 moves so as to release the stress. As a result, the stable flying of the slider is no longer hindered by a stress from the waveguide 10. In the present example, the movable portion 29 was formed in a mount 30 made of silicon. A flexure 16 was formed between the movable portion 12 and the mount 30 such that the movable portion 29 could move in the arrow direction relative to the mount 30. The waveguide 10 was arranged so as to be located at the center of the slider. In the same manner as with the example of FIG. 2A and FIG. 2B, a mirror 43 was formed at the end portion of the waveguide 10 such that a light emitted from the waveguide 10 was coupled in the waveguide 3 inside the slider.

In the above example, in order to suppress a fluctuation of the coupling efficiency between the waveguide 10 and the waveguide 3, it is possible that a fluctuation can be suppressed by enlarging a mode field diameter of each waveguide, in the same manner as with the example of FIG. 1. In order to suppress a fluctuation to a smaller one, it is also possible that, as illustrated in the example of FIG. 13, a feedback loop is formed by monitoring an amount of lights coupled in the waveguide 3 to control a light amount of the light source. Instead of that, it is also possible that, after monitoring the position of the movable portion 29 relative to the mount 30, an intensity of the light source is controlled based on the displacement amount. In the present example, a capacitance sensor was formed on the mount 30 as a displacement sensor 28, as illustrated in FIG. 16. After measuring in advance the relation between outputs of the displacement 28 and change rates of the coupling efficiency between the waveguides, when the movable portion 29 was continuously moved, a current amount of the semiconductor laser was adjusted based on the data. The actual circuit was structured with a voltage Vp applied to the piezo driver in the example of FIG. 12, being replaced by an output voltage of the displacement sensor.

Figure 17A:
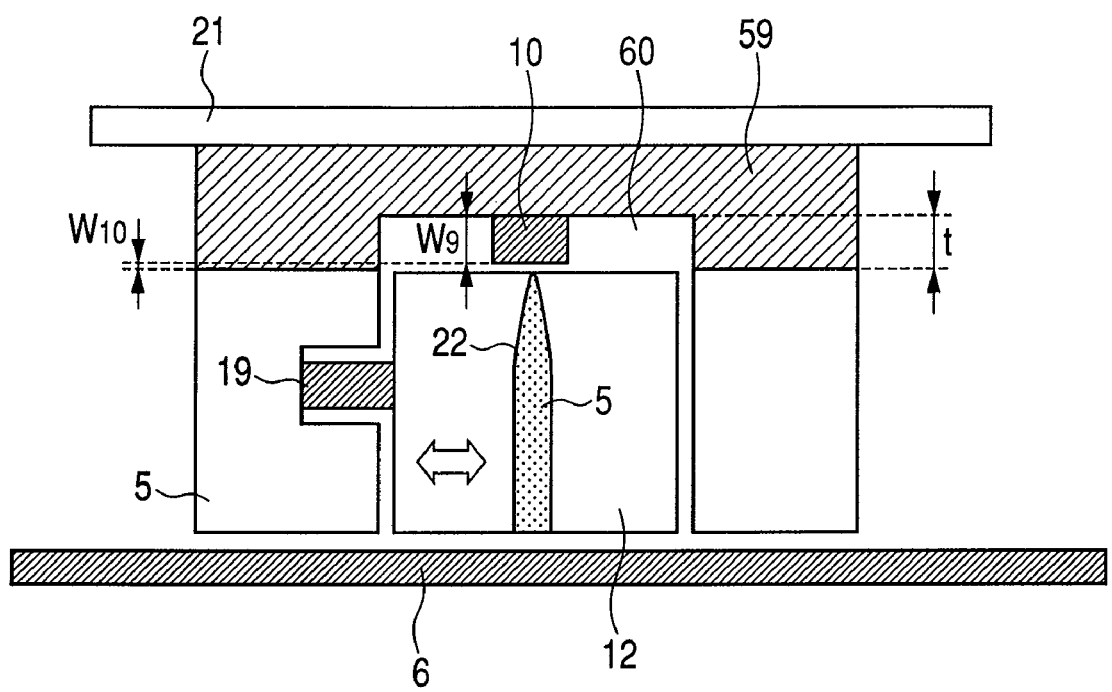
FIG. 17A and FIG. 17B is a view illustrating an example of the case where the waveguide inside the slider moves.
Figure 17B:
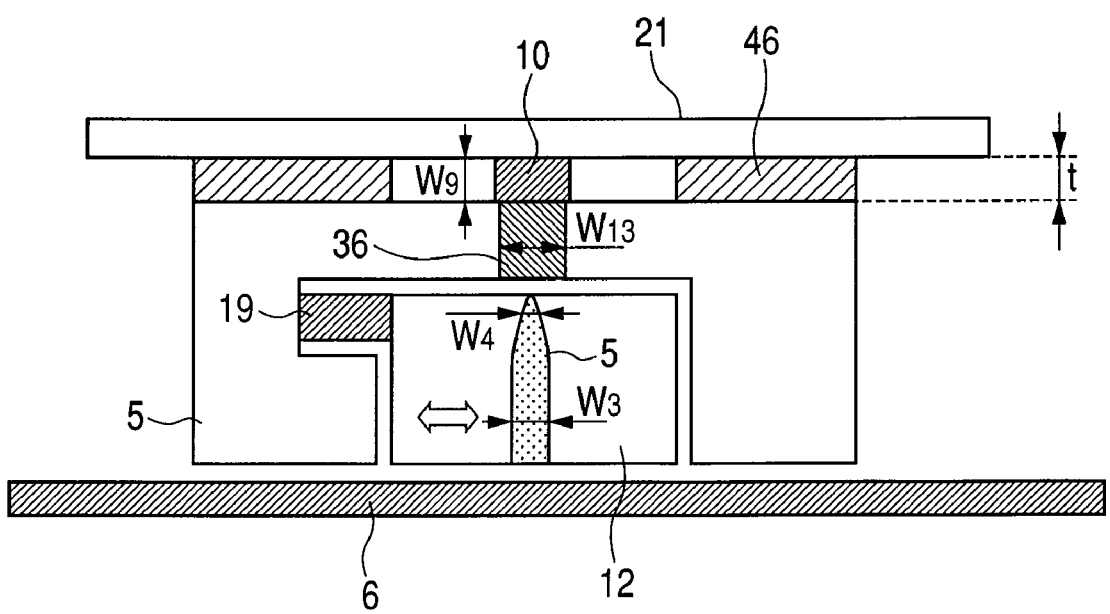

In the above example, the movable portion for the tracking servo was placed outside the slider; however, the movable portion may also be provided inside the slider. Due to the structure, the movable portion can be lighter, thereby the movable portion can move at a higher response speed. FIG. 17A and FIG. 17B illustrate an example thereof. FIG. 17A and FIG. 17B are views seen from the discharge end side of the slider (trailing edge side). In the example illustrated in FIG. 17A, a light emitted from the waveguide 10 for propagating a light from the light source, was made so as to be directly incident in the waveguide 3 inside the slider. A mount 59 on the bottom face of which a slot 60 for arranging the waveguide 10 was formed, is arranged under the suspension 21, and the waveguide 10 was adhered to the slot 60 of the mount 60. In the present example, the material of the mount was set to silicon, and the slot was formed by etching the silicon. As the waveguide, a waveguide made of polymer was adopted. In the same manner as with the example of FIG. 2A and FIG. 2B, a mirror 43 was formed at the end portion of the waveguide 10 such that a light emitted from the waveguide 10 was directly coupled in the waveguide 3 inside the slider.

The movable portion 12 was formed in the central portion of the slider such that the movable portion 12 could move in the direction perpendicular to the recording track. The movable portion 12 was driven by the piezo element 19 arranged inside the slider. The optical near-field generating element 1, the waveguide 3, and the magnetic field generator, were formed inside the movable portion. A mode field diameter at the inlet of the waveguide 3 was enlarged by forming a taper portion 22 in the upper portion of the waveguide 3. The distance $W_{10}$ between the waveguide 10 and the slider was set to 0 or more such that the waveguide 10 on the waveguide mount 59 and the movable portion of the slider were not in contact with each other. In the present example, a depth t of the slot 60 of the waveguide mount was set to 35 μm, and the thickness $W_9$ of the waveguide to 30 μm. In the case, the distance between the waveguide 10 and the movable portion of the slider is 5 μm. In the above example, the material of the mount 59 of the waveguide 10 was set to silicon; however, the material may also be a film made of polymer material, such as polyimide. In the case, the mount 59 and the polymer waveguide 10 may also be formed as one body. In addition, a polymer material for the mount 59 and the clad material of the polymer waveguide 10 may also be the same.

In the example illustrated in FIG. 17B, the waveguide 36 was formed between the waveguide 10 for propagating a light from the light source and the waveguide 3 inside the waveguide. The waveguide 10 was fixed on the suspension 21, and a spacer 46 having a thickness substantially the same as the thickness $W_9$ of the waveguide 10, was arranged beside the waveguide 10. In the present example, the waveguide 10 was set to be a waveguide made of polymer, and the material of the spacer 46 set to polyimide. The spacer 46 was formed on the surface of the suspension 21 in advance. The thickness $W_9$ of the waveguide was set to 30 μm, and the thickness t of the spacer 36 also to 30 μm. The waveguide 36 was formed on the slider 5. With regard to the structure of the waveguide 36 and the waveguide 10, a mirror was formed at the end portion of the waveguide 10 such that a light reflected by the mirror was coupled in the waveguide 36, in the same manner as with FIG. 2A and FIG. 2B. The core material of the waveguide 36 was set to $SiO_xN_y$, and the clad material to $SiO_2$. In order to increase a coupling efficiency between the waveguide 10 and the waveguide 36, it is preferable that a mode field diameter of the waveguide 36 is close to that of the waveguide 10. In the present example, mode field diameters of the waveguide 10 and the waveguide 36 were set to 6 μm.

The movable portion 12 was formed inside the slider, and the optical near-field generator, the magnetic field generator, the magnetic read sensor, and the waveguide 3 for guiding a light to the optical near-field generator, were formed inside the movable portion 12. In order to execute the tracking servo, the movable portion 12 was provided with the piezo element 19 such that the movable portion 12 could move in the arrow direction of the drawing. The movable portion 12 moves relative to the slider 5, accordingly, the waveguide 3 moves relative to the waveguide 36 on the slider. In the case, in the same manner as with the example of FIG. 1, a power fluctuation of a light in the waveguide 3 is smaller as a mode field diameter at the inlet of the waveguide 3 is enlarged. To achieve this, as illustrated in FIG. 17B, a mode field diameter at the inlet of the waveguide 3 was enlarged by means that the core width $W_4$ at the inlet of the waveguide 3 was set to be smaller than the core width $W_3$ in the lower portion of the waveguide 3. In the present example, a mode field diameter at the inlet of the waveguide 3 was set to 4 μm.

In the present example, a light emitted from the waveguide 10 for propagating a light from the light source, was set to be reflected by a mirror formed at the end of the waveguide 10, subsequently to be incident in the waveguide 3 inside the slider. In the case, the two waveguides were coupled via the mirror formed at the end of the waveguide 10; however, it is also possible that an optical device, such as lens, is inserted between the two waveguides. In the case where an optical device, such as lens, is not inserted between the waveguides, a production cost can be suppressed to a cheaper one, and a thickness of the whole slider including parts for optical transmission can also be thinned. Therefore, the gravity center of the whole slider is low, allowing the flying stability of the slider to be improved. Contrary to that, in the case where an optical device, such as lens, are inserted between the two waveguides, there is a disadvantage that a cost is expensive, etc.; on the other hand, there is an advantage that a beam diameter of a light propagating between the two waveguides can be enlarged, thereby allowing a tolerance for a dislocation between the two waveguides to be enlarged.

Figure 18:
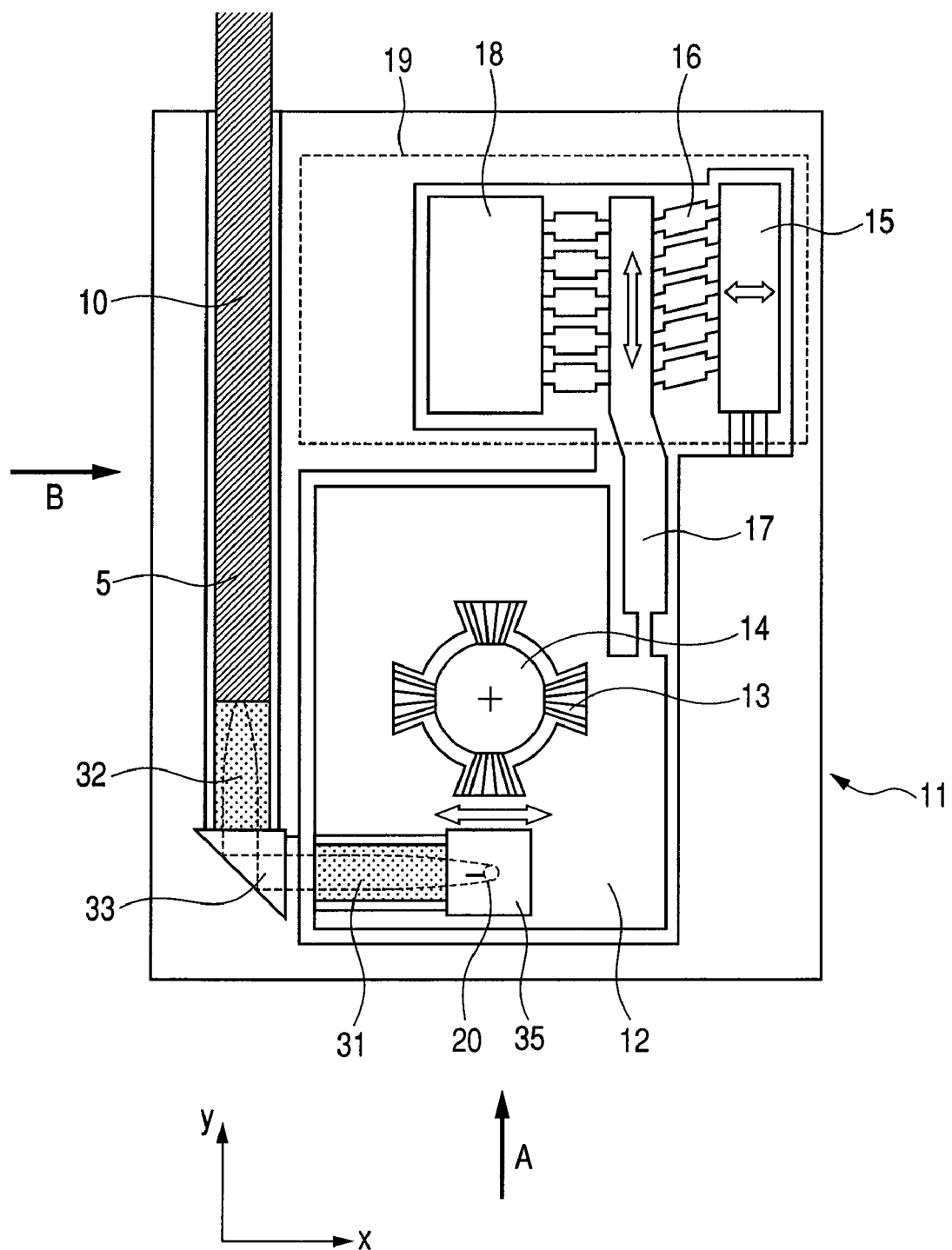
FIG. 18 is a view illustrating an example of the case where a lens is arranged between the waveguide for propagating a light from the light source to the slider, and the waveguide inside the slider, seen from the medium side.
Figure 19:
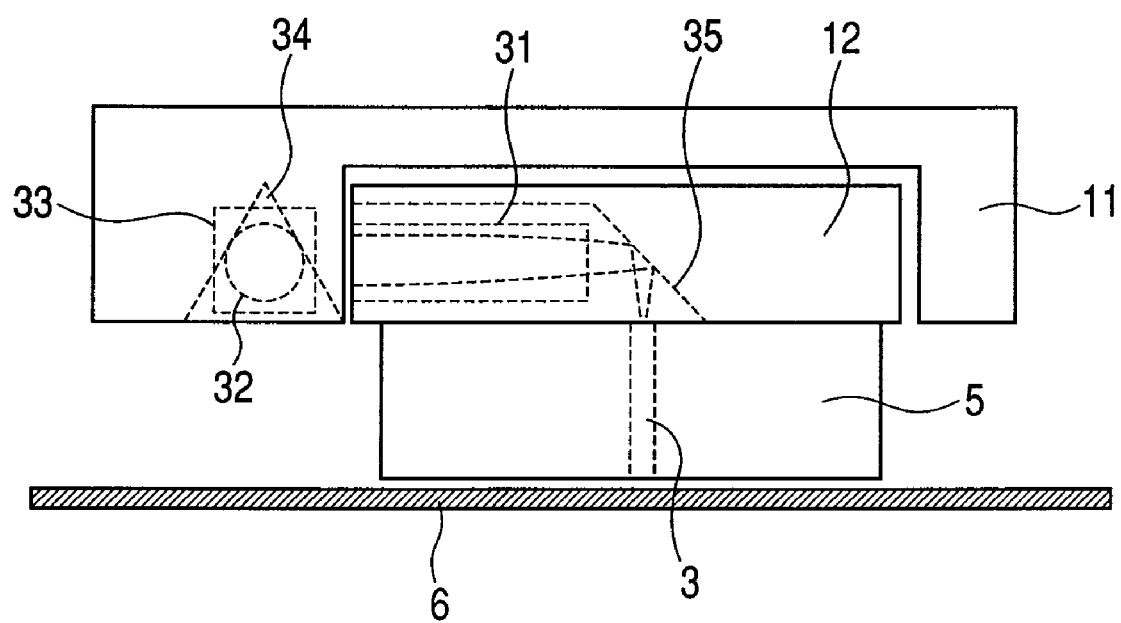
FIG. 19 is a view illustrating an example of the case where a lens is arranged between the waveguide for propagating a light from the light source to the slider, and the waveguide inside the slider, seen from the lateral side of the slider.

FIG. 18 and FIG. 19 illustrate an example in which a lens and a reflecting prism are inserted between the two waveguides. As the waveguide 10, an optical fiber made of glass was adopted, which was placed in a V-slot 34 formed on the fixed portion 11. A GRIN (Gradient Index) lens was arranged at the outlet of the waveguide 10 such that an emitted light was a parallel light. A light emitted from the GRIN lens 32 was reflected by the reflecting prism 33 to be collected by the GRIN lens 31 placed on the movable portion 12. The collected lights were reflected by the mirror 35 formed on the movable portion 12 to guide to the waveguide 3 inside the slider. The lights collected by the GRIN lens 31 were to be collected at the inlet of the waveguide 3.

In the above example, a parallel light propagates between the fixed portion 11 and the movable portion 12. In the case, even when the lens 31 moves horizontally or vertically to the light traveling direction, the collecting point is always located at the inlet of the waveguide 3. Accordingly, a power fluctuation of a light in the waveguide 3, which occurs when the movable portion 12 moves, can be suppressed. In the present example, an optical fiber made of glass is used as the waveguide 10; however, an optical fiber made of plastics or a polymer waveguide is also used instead of that. In addition, the GRIN lens is used as a lens; however, a minute convex lens or a Fresnel lens or the like may also be used instead of that.

In the above example, when focal lengths of the lenses 31 and 32 satisfy the following equation: $f_1/f_2=d_1/d_2$ (wherein, $f_1$ represents the focal length of the lens 32 on the fixed portion side, $f_2$ the focal length of the lens 31 on the movable portion, $d_1$ a mode field diameter in the waveguide 10, and $d_2$ a mode field diameter in the waveguide 3), an optical coupling efficiency between the two waveguides can be made highest. In the present example, a mode field diameter at the inlet of the waveguide 3 inside the slider was set to 4 μm, and that in the waveguide 10 to 8 μm. Accordingly, $f_1$ was set to 600 μm and $f_2$ to 300 μm. As stated above, by means that a mode field diameter of the waveguide 10 is made enlarged while satisfying $f_1>f_2$, the position control of the waveguide 10 can be easily performed at the coupling portion between the semiconductor laser and the waveguide 10. The larger the mode field diameter, the larger tolerance for dislocation. When the shape of the intensity distribution of lights in the waveguide is elliptic, assuming that a mode field diameter in the long axis direction is $d_x$, and that in the short axis direction is $d_y$, a mode field diameter d in the waveguide may be considered as $d=\sqrt{(d_x \cdot d_y)}$.

Figure 20:
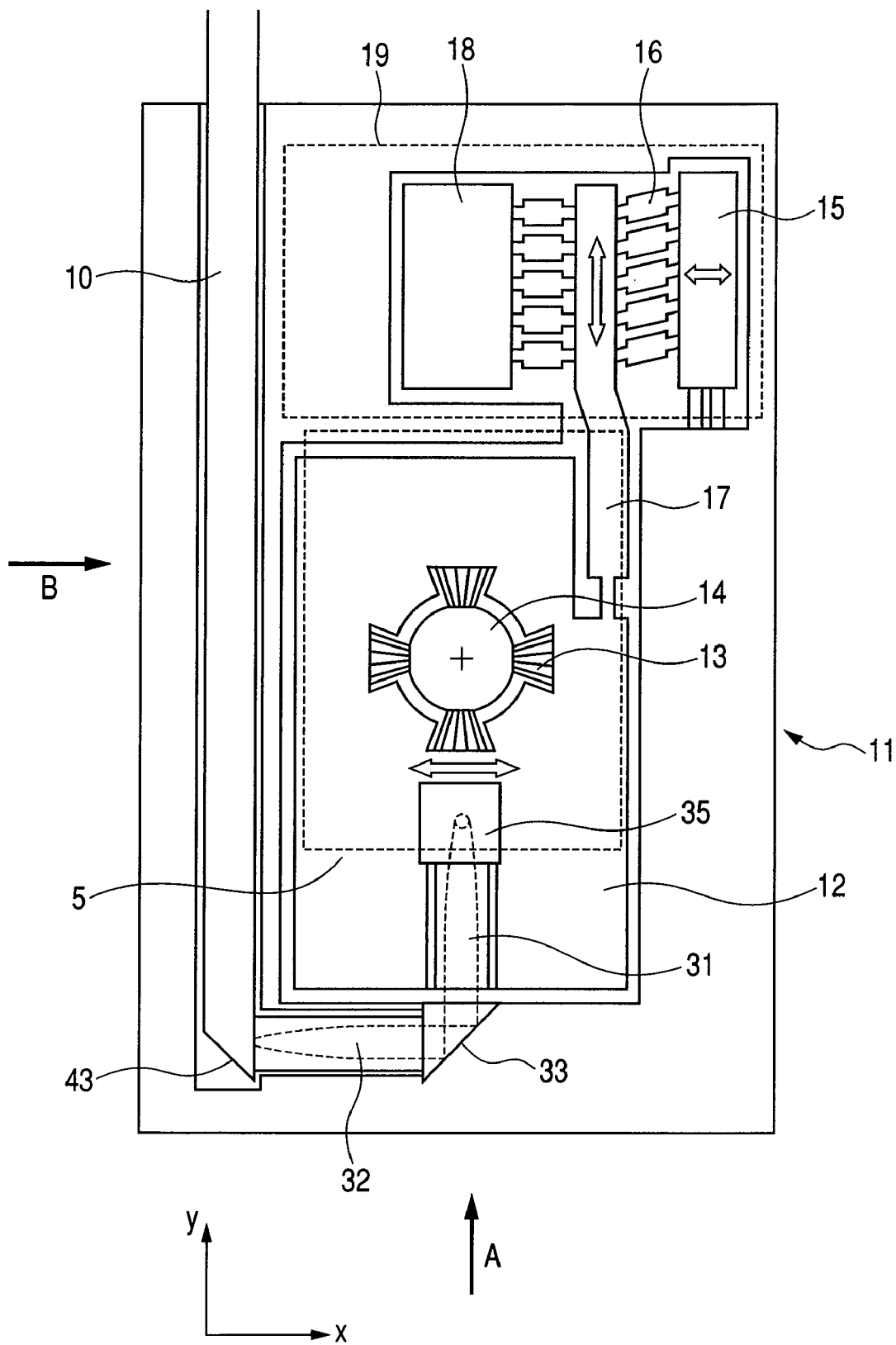
FIG. 20 is a view illustrating an example of the case where a lens is arranged between the waveguide for propagating a light from the light source to the slider, and the waveguide inside the slider, and where the propagation direction of a light propagating between the lenses, is perpendicular to the movement direction of the movable portion.

In the example of FIG. 18, the lens 31 on the movable portion 12 was arranged such that the axis of the lens was to be parallel to the traveling direction of the movable portion 12; however, it is also possible that the lens is arranged such that the axis thereof is perpendicular to the traveling direction of the movable portion 12. In the example of FIG. 20, a reflecting mirror 43 was formed at the end face of the waveguide 10, and a light emitted from there was made a parallel light by the GRIN lens 32. The parallel light was reflected by the reflecting prism 33 to be collected by the lens 31.

Figure 21:
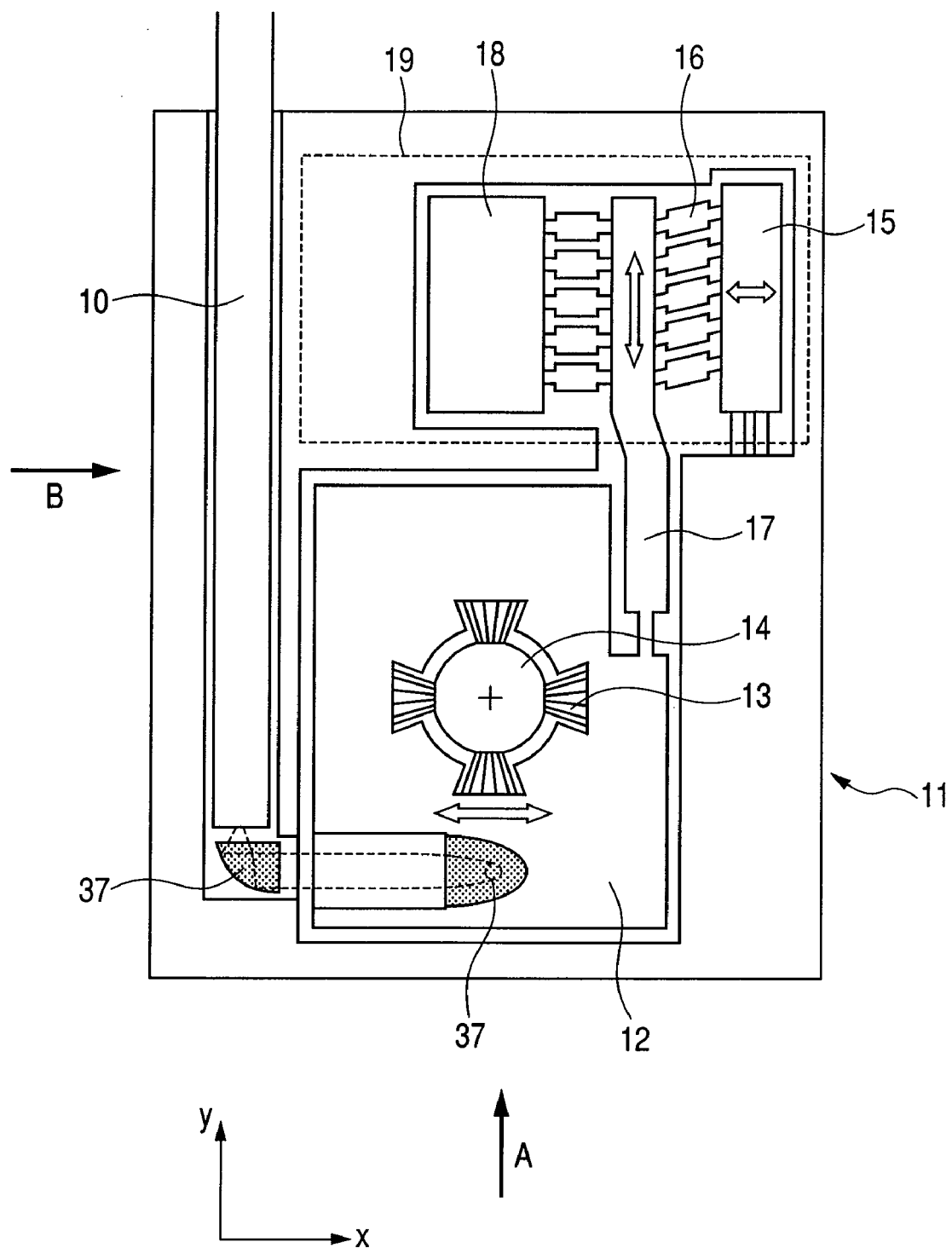
FIG. 21 is a view illustrating an example of the case where a mirror is arranged between the waveguide for propagating a light from the light source to the slider, and the waveguide inside the slider.

In the example of FIG. 18, a light emitted from the waveguide 10 was made a parallel light by using the lens 32; however, it is also possible that the light was made a parallel light by using a mirror. In the example of FIG. 21, a light emitted from the waveguide 10 was made a parallel light by an aspheric mirror 37 arranged on the fixed portion 11. A light reflected by the mirror 37 was reflected in the direction of the slider by an aspheric mirror 37 on the movable portion 12, and at the same time collected such that the light centered on the inlet of the waveguide 3 inside the slider.

Figure 22:
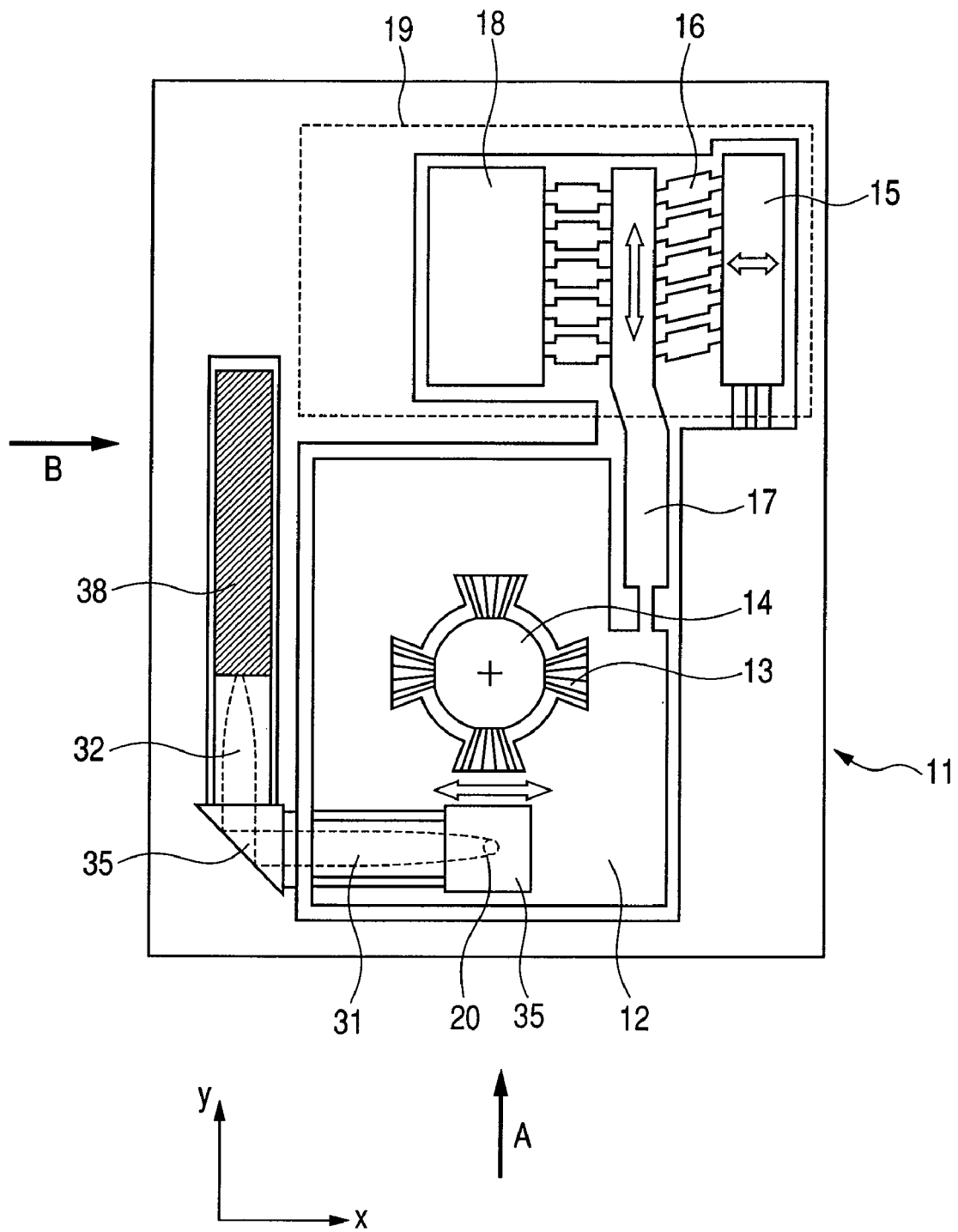
FIG. 22 is a view illustrating an example of the case where a semiconductor laser is formed near the slider, and where two mirrors are formed between the semiconductor laser and the waveguide inside the slider.

In the above example, a light from the light source (semiconductor laser) was propagated to the slider through the waveguide 10; however, a semiconductor laser may also be arranged on the fixed portion 11. In the example illustrated in FIG. 22, a light from the semiconductor laser 38 arranged on the fixed portion 11, was made a parallel light by the GRIN lens 32; then the parallel light was bent to the direction of the movable portion 12 by the reflecting prism 35. The GRIN lens 31 was arranged on the movable portion 12 such that a light from the reflecting prism 35 was collected at the inlet of the waveguide 3 inside the slider.

Figure 23:
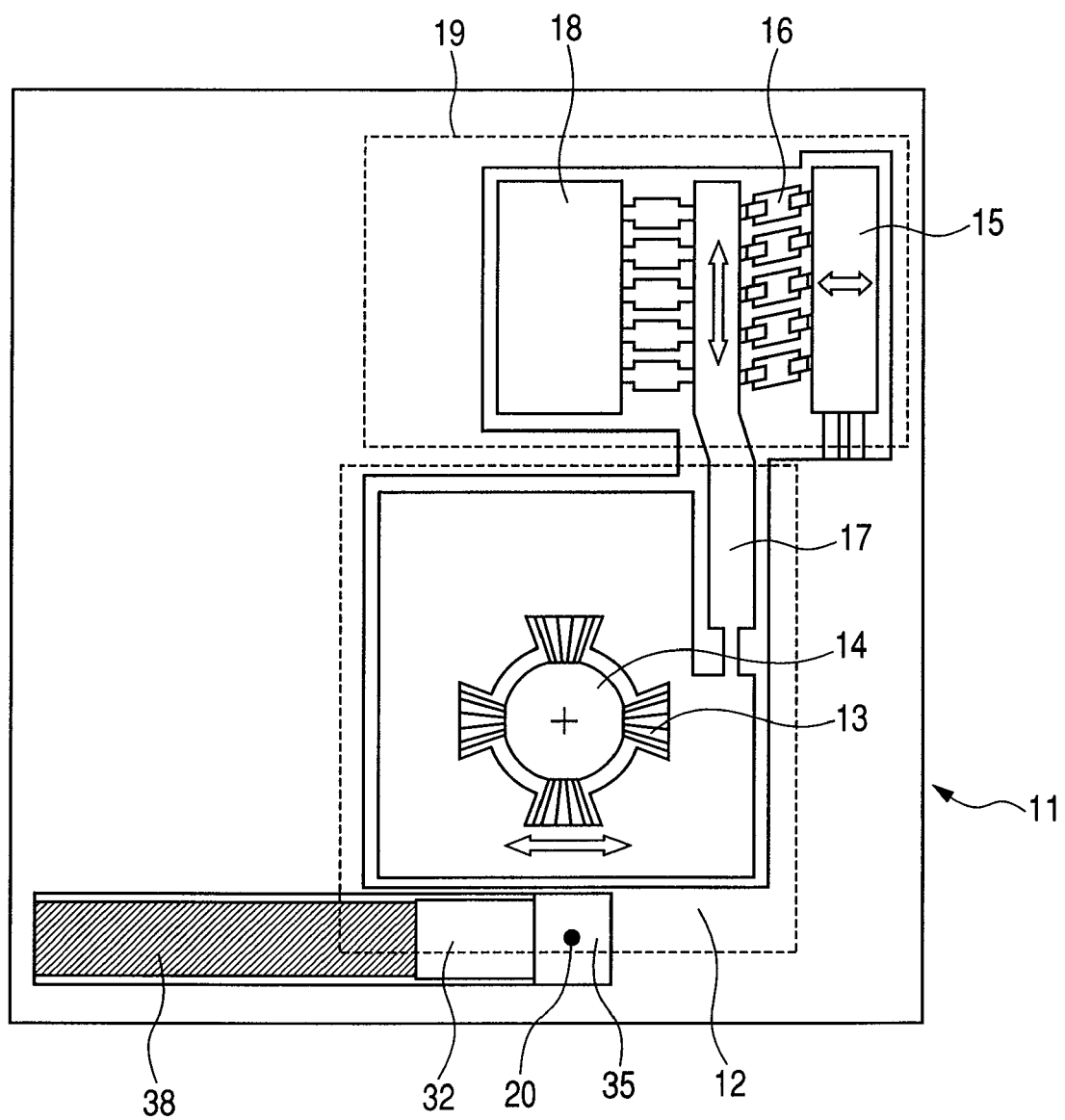
FIG. 23 is a view illustrating an example of the case where a semiconductor laser is formed near the slider, and where a mirror is formed between the semiconductor laser and the waveguide inside the slider.
Figure 24A:
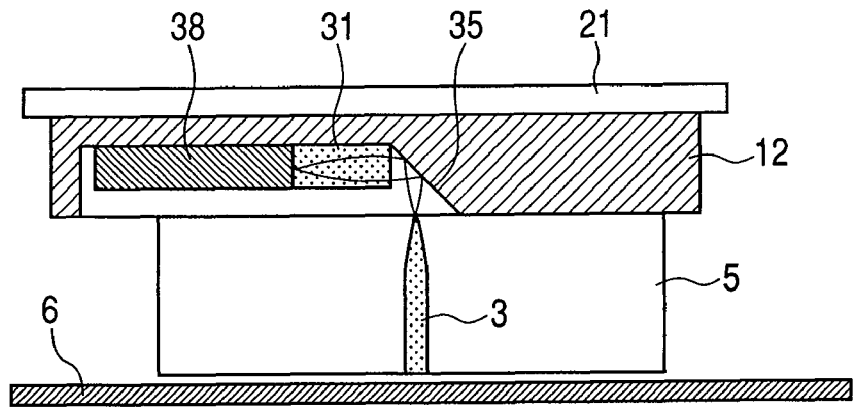
FIG. 24A, FIG. 24B, and FIG. 24C are views illustrating an example of the case where a semiconductor laser is formed near a slider.
Figure 24B:
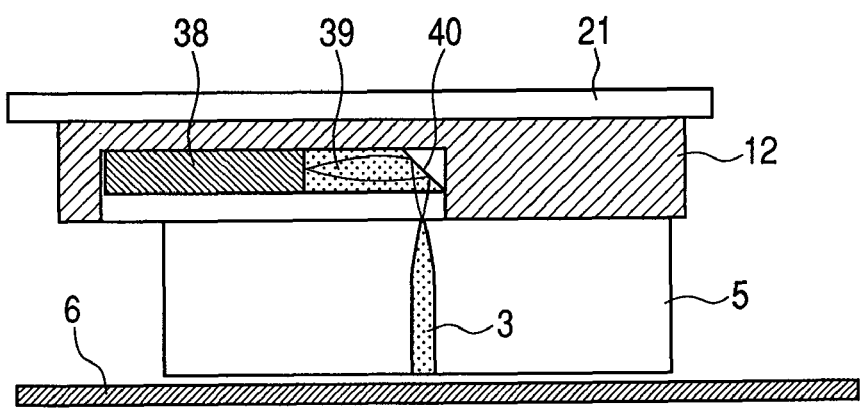
Figure 24C:
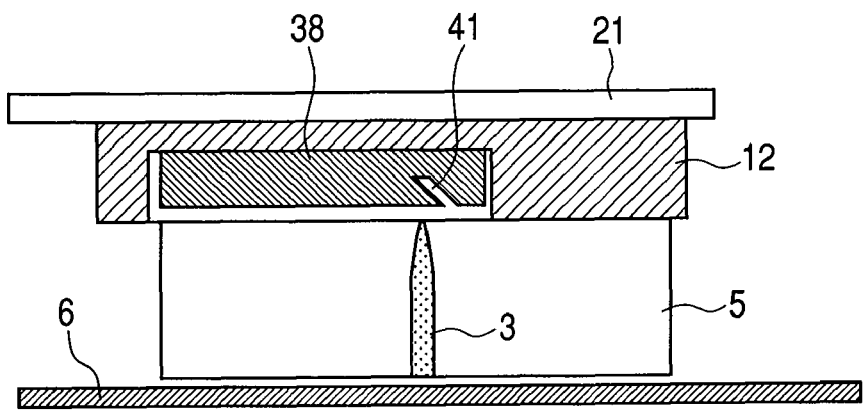

In the example illustrated in FIG. 23, the semiconductor laser 38 was arranged such that the emitting direction was to be x direction. A light emitted from the semiconductor laser 38 was collected by the GRIN lens 32 such that the light was collected at the inlet of the waveguide 3 inside the slider, as illustrated in FIG. 24A. A light emitted from the GRIN lens 31 was bent to the slider side by the mirror 35 formed on the fixed portion 11. In the example of FIG. 24B, a light that had passed through the GRIN lens 39 was made to be emitted to slider side by forming the mirror 40 on the GRIN lens 39. In the example of FIG. 24C, the mirror 41 was formed near the emitting face of the semiconductor laser 38. In the case, a light emitted from the semiconductor laser 38 is directly incident in the waveguide 3.

Figure 25:
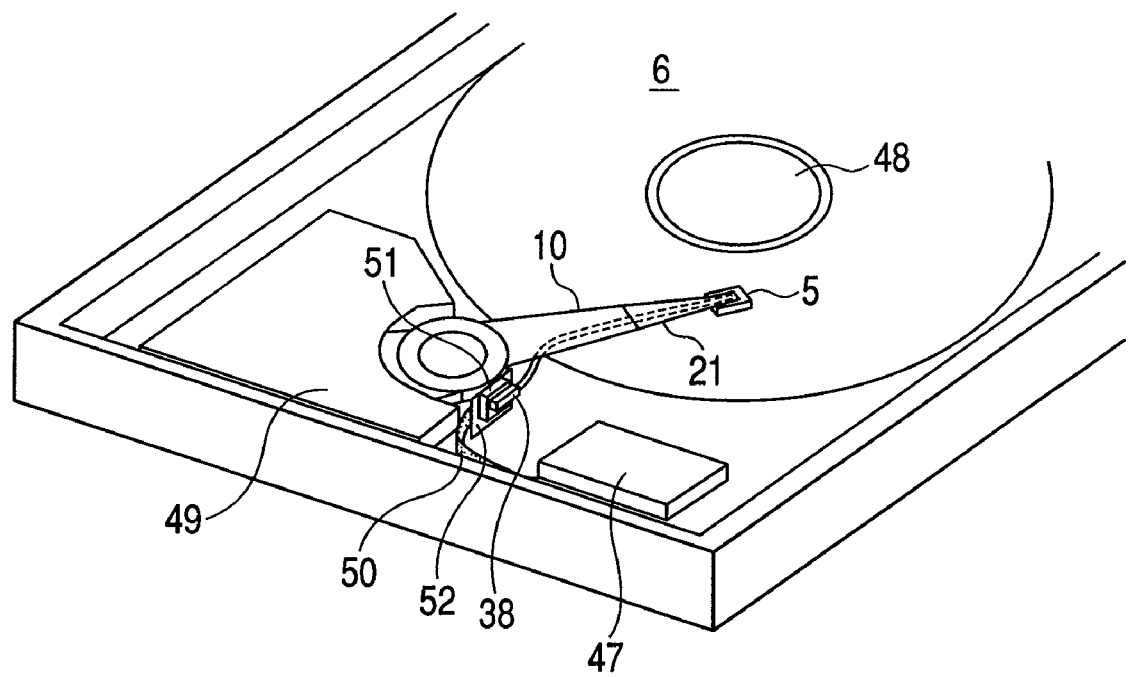
FIG. 25 is a view illustrating an example of a structure of a recording reproduction apparatus.

The overall view of a recording apparatus using the above head gimbal assembly is illustrates in FIG. 25. The flying slider 5 was fixed to the suspension 21, and positioned at a desired track position on a magnetic disk 6, by an actuator composed of a voice coil motor 49. A flying pad was formed on the head surface and the head was made to float over the magnetic disk 6 with a flying amount of 10 nm or less. The recording disk 6 was fixed to a spindle 48, which was rotationally driven by the motor, and rotated. After the semiconductor laser 38 was fixed on the sub-mount 51 by soldering, the sub-mount 51 was arranged at the root (portion called e-block) of an arm to which the suspension had been fixed. The driver of the semiconductor laser 38 was arranged on a circuit board 52 that was to be arranged on the side of the e-block. A driver for the magnetic head was also mounted on the circuit board 52. The sub-mount 51 on which the semiconductor laser 38 is mounted, may be arranged directly on the e-block, or on the circuit board 52 for the driver. A light emitted from the semiconductor laser 38 was directly coupled in the waveguide 10 either by the waveguide 10 directly being coupled to the semiconductor laser or by inserting a lens between them. In the case, it is also possible that the waveguide 10, the semiconductor laser 38, and elements or parts for coupling the two, are formed into one bode as a module, which is arranged on either the e-block or a circuit board on the side of the e-block. In addition, the module may be airtightly sealed for the longer durability of the semiconductor laser 38. A recording signal was generated by a signal-processing LSI 47, and the recording signal and a power source for the semiconductor laser were supplied to the driver for the semiconductor laser via the FPC (Flexible Print Circuit) 50. At the moment of recording, a magnetic field was generated by the coil provided in the flying slider 5, and simultaneously the semiconductor laser was made to emit a light, thereby a recording mark was formed. The data recorded on the recording medium 6 was reproduced by the magnetic read sensor (GMR or TMR device) that was formed inside the flying slider 5. The signal processing of a reproduction signal was performed by the signal-processing circuit 47.

Figure 26:
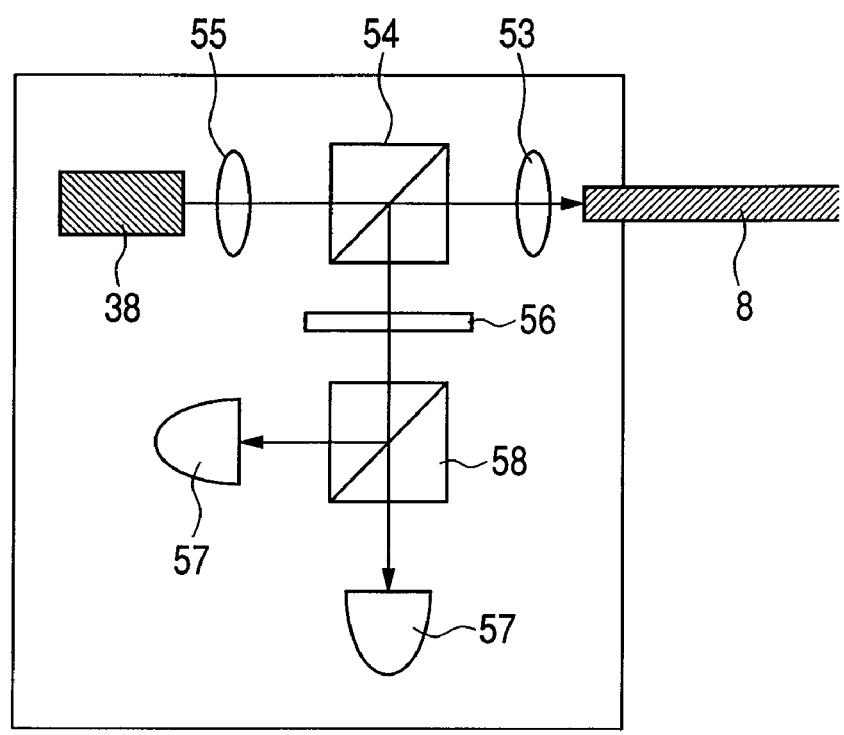
FIG. 26 is a view illustrating an optical system for the optical reproduction.

In the above example, the GMR or TMR device was adopted in order to reproduce the recording information; however, a light may also be adopted to reproduce the recorded information. That is, a light that returns after hitting the recording bit propagates toward the direction of the light source through the waveguide 3 inside the slider, and the waveguide 10 coupling the light source and the slider. The direction of magnetization of the recording bit was detected by detecting a rotation of a polarized light that returns from the recording bit. An optical system illustrated in FIG. 26 was adopted for the detection.

A light emitted from the semiconductor laser 38 was made a parallel light by a collimate lens 55, and collected by a coupling lens 53 to be introduced to the waveguide 10. A return light from the recording bit, which is emitted from the waveguide 10, was made to a parallel light by the coupling lens 53 and separated from an incident light by passing through the beam splitter 54. The separated return light from the recording bit was separated into two lights of which polarization directions were orthogonal with each other, by introducing the light to a ½ wave plate 56 and the beam splitter 58. Each light was detected by the photodiode 57, and the magnetization direction of the recording bit was detected by monitoring an intensity difference between the detected signals. In the case, the direction of the ½ wave plate 56 was adjusted such that an intensity of a signal was to be a maximum. The above optical system was formed in the module, which was arranged at the root of the arm.

In the above example, a magnetic recording medium was used as a recording medium; however, other recording media, such as a phase-change medium, a photochromic medium, and a dye medium, may also be adopted. For example, in the case of the phase-change medium, the recorded information can be read out by detecting an intensity change of a return light from the recording bit. In the case, a return light is directly detected by a photodiode, excluding the wave plate 56 and the polarization beam splitter 58 from the system in FIG. 26. In the case where a recording medium is one in which the recording is performed by the light irradiation, such as a phase-change medium, a photochromic medium, and a dye medium, a magnetic pole and a coil for generating a magnetic field are not necessary, and the recording and reproduction of information can be performed by irradiating a light to the recording medium.

What is claimed is:

1. A head gimbal assembly comprising: a slider configured to fly over a moving medium and having a light irradiating unit configured to irradiate light; a first waveguide inside the slider and configured to guide light to the light irradiating unit; and a second waveguide configured to propagate light to the first waveguide inside the slider, wherein a relative position between the first waveguide and the second waveguide is movable.

2. The head gimbal assembly according to claim 1, further comprising a reflecting mirror on the end face of the second waveguide, wherein the incident end of the first waveguide is arranged near the emitting face of the second waveguide.

3. The head gimbal assembly according to claim 1, wherein a mode field diameter in the movable direction of the first waveguide and a mode field diameter in the movable direction of the second waveguide are 3.5 µm or more.

4. The head gimbal assembly according to claim 3, wherein at least one of the mode field diameter in the movable direction of the first waveguide and the mode field diameter in the movable direction of the second waveguide is larger than a mode field diameter in the direction perpendicular to the movable direction.

5. The head gimbal assembly according to claim 1, wherein the first waveguide or the second waveguide is on a mount of which position is changed by applying a voltage.

6. The head gimbal assembly according to claim 1, further comprising two lenses at an emitting portion of the second waveguide and at the inlet portion of the first waveguide, respectively, configured so as to propagate parallel light between the two lenses.

7. The head gimbal assembly according to claim 6, wherein, assuming that a focal length of the lens on the second waveguide side is $f_1$, and that of the lens on the first waveguide side is $f_2$, $f_1 > f_2$ is satisfied.

8. An information recording apparatus comprising: a recording medium; a medium driving unit configured to drive the recording medium; a light source; a head gimbal assembly including a slider configured to fly over the recording medium and having a light irradiating unit configured to irradiate light, a first waveguide inside the slider and configured to guide light to the light irradiating unit, a second waveguide configured to propagate light to the first waveguide inside the slider, wherein a relative position between the first waveguide and the second waveguide is movable; and an actuator configured to position the light irradiating unit within the slider at a desired position.

9. The information recording apparatus according to claim 8, wherein the first waveguide or the second waveguide is on a mount of which position is changed by applying a voltage, and wherein the information recording apparatus further comprises: a recording unit in which a relation between the applied voltage and a coupling efficiency between the first waveguide and the second waveguide is recorded in advance; and a control unit configured to adjust an intensity of the light source in accordance with the applied voltage, based on the relation recorded in the recording unit in advance, such that the intensity of light emitted from the light source is to be constant.

10. The information recording apparatus according to claim 8, further comprising: a detector configured to detect an intensity of light coupled in the first waveguide; and a control unit configured to adjust a light intensity of the light source such that an intensity of the light detected by the detector is to be constant.

11. The information recording apparatus according to claim 8, further comprising: a recording unit configured to record in advance a relation between a dislocation amount between the incident end of the first waveguide and the emitting end of the second waveguide, and a coupling efficiency between the two waveguides; a displacement sensor configured to measure a dislocation amount between the incident end of the first waveguide and the emitting end of the second waveguide; and a control unit configured to control an intensity of the light source in accordance with an output of the displacement sensor, based on the relation recorded in advance, such that an intensity of light emitted from the light irradiating unit is to be constant.

* * * * *